(12) United States Patent
Yasunaga

(10) Patent No.: US 7,635,229 B2
(45) Date of Patent: Dec. 22, 2009

(54) OPTICAL DIAPHRAGM APPARATUS

(75) Inventor: Shinji Yasunaga, Asaka (JP)

(73) Assignee: Olympus Corporation, Tokyo (JP)

( * ) Notice: Subject to any disclaimer, the term of this patent is extended or adjusted under 35 U.S.C. 154(b) by 379 days.

(21) Appl. No.: 11/542,925

(22) Filed: Oct. 4, 2006

(65) Prior Publication Data
US 2007/0098399 A1 May 3, 2007

(30) Foreign Application Priority Data
Nov. 1, 2005 (JP) ............................. 2005-318307

(51) Int. Cl.
*G03B 9/02* (2006.01)
*G03B 9/08* (2006.01)
(52) U.S. Cl. ...................... 396/508; 396/449
(58) Field of Classification Search ............... 396/449, 396/458–461, 463, 505–510; 310/311, 324, 310/330, 367
See application file for complete search history.

(56) References Cited

U.S. PATENT DOCUMENTS 5,150,702 A * 9/1992 Miyanaga et al. ........... 600/181
5,490,015 A   2/1996 Umeyama et al.

FOREIGN PATENT DOCUMENTS

JP          3204793          6/2001
JP    2002330598 A   * 11/2002

* cited by examiner

*Primary Examiner*—Melissa J. Koval
*Assistant Examiner*—Minh Q Phan
(74) *Attorney, Agent, or Firm*—Scully, Scott, Murphy & Presser, P.C

(57) ABSTRACT

An ion conducting high-polymer member is formed by an ion containing polymer, and has a circular arc shape. An chord length of the ion conducting high-polymer member is changed. Due to the change in the chord length of the ion conducting high-polymer member, there is change in a relative position of a driving shaft which is coupled with the ion conducting high-polymer member, with respect to a rotating shaft. Due to the change in the relative position of the driving shaft, a circular ring shaped peripheral section is displaced, and due to a rotation of a diaphragm member around the rotating shaft as a center, a part of an aperture is shielded by the circular ring shaped peripheral section, and a diameter of the aperture is changed.

8 Claims, 22 Drawing Sheets

OPTICAL DIAPHRAGM APPARATUS

CROSS-REFERENCE TO RELATED APPLICATION

The present application is based upon and claims the benefit of priority from the prior Japanese Patent Application No. 2005-318307 filed on Nov. 1, 2005; the entire contents of which are incorporated herein by reference.

BACKGROUND OF THE INVENTION

1. Field of the Invention

The present invention relates to an optical diaphragm apparatus, and particularly to a small size optical diaphragm apparatus.

2. Description of the Related Art

In endoscope apparatuses in which a solid imaging device is used, using an optical system of a fixed focus and a fixed diaphragm has hitherto been common. At the same time, with a progress in a semiconductor manufacturing technology, a solid imaging device which has fine pixels has been applicable even in an endoscope. Such a solid imaging device of fine pixels is sensitive to a change in a focal position due to a distance up to an object to be photographed. In observation and examination by an endoscope apparatus, it is difficult to maintain a constant distance all the time from an object to be photographed such as a wall surface of a body cavity and a diseased part. Therefore, in an endoscope apparatus which includes a conventional optical system, it has been difficult to obtain a high-definition image in which peculiarities of minute pixels are fully exploited.

For avoiding this problem, the following two methods (1) and (2) are available.

(1) A method of adding a focusing function which displaces a part of a lens, or an entire lens in accordance with a distance from the object to be photographed.

(2) A method in which an optical system is let to be a fixed focus, and focusing has been performed to have a proper image formation with respect to an object to be photographed at a far point, and a satisfactory image formation is achieved by increasing a depth of focus (focal depth) by reducing an aperture diameter at a time of near point photography.

In a case of the method (2) mentioned above, a variable diaphragm mechanism is necessary. Therefore, there is a problem that a quantity of light reaching the solid imaging device at the time of near point photography is decreased. Here, in an endoscope in which a picture is normally taken by light of an illuminating unit at a front end section, it is possible to secure a sufficient quantity of light at the time of near point photography. Therefore, the decrease in the quantity of light at the time of the near point photography does not become a major problem.

Thus, in the endoscope apparatus, for making a full use of a capacity of the imaging device of minute pixels, at least one of a lens driving unit and a variable diaphragm unit is required. From a point of view of an optical efficiency, method (1) is excellent. However, it is quite difficult to incorporate the lens driving unit in an endoscope of a small diameter.

Therefore, for the endoscope of a small diameter, it is desirable to use an ultra small variable diaphragm apparatus. An example of the ultra small variable diaphragm apparatus which can be used in an endoscope is proposed for example, in Japanese Patent No. 3204793.

A structure disclosed in Japanese Patent No. 3204793 will be described below by referring to FIG. 21 and FIG. 22. A rotating disc 36 in a form of a ring which rotates around an optical axis L as a center is provided. A movable object 37 is provided on one surface of the rotating disc 36. A stacked-layered piezoelectric element 38 is mounted on and fixed to the movable object 37.

An axial direction of expansion and contraction of the piezoelectric element 38 is set up toward a tangential direction of a virtual circle with the optical axis L as a center. The piezoelectric element 38 is disposed inside a groove 40 which is formed in a piezoelectric element frame 39.

The movable object 37 is integrated with the rotating disc 36 to form an essential rotating movable object. Moreover, the movable object 37 is installed so as to slide upon being pressure-welded on a wall surface of a frame 41 of a lens barrel 21. Furthermore, the circulating disc 36 is installed so as to slide upon being pressure-welded also on a wall surface of the piezoelectric element frame 39. Thus, the piezoelectric element frame 39 and the frame 41 of the lens barrel 21 form an integrated stationary member. Accordingly, the rotating disc 36 can be rotated by applying a drive voltage as mentioned above, to the piezoelectric element 38.

A diaphragm blade 35 is formed by disposing three blade members at same interval. Each diaphragm blade 35 is pushed by a diaphragm pushing member 40a. Moreover, an intermediate portion of each diaphragm blade 35 is pivoted by a supporting pin 41a which is erected in the diaphragm pushing member 40a.

A rear end of the diaphragm blade 35 is connected to a driving pin 42 which is erected in the rotating disc 36. When the rotating disc 36 rotates, the diaphragm blade 35 rotates around the supporting pin 41a as a center. Accordingly, it is possible to adjust an aperture value.

A guide hole 44 in which a pin 43 which is erected between the piezoelectric element frame 39 and the diaphragm pushing member 40 is fitted, is provided in the rotating disc 36. Moreover, a movement of the pin 43 is regulated by both ends of the guide hole 44, and a range of rotation of the rotating disc 36 is regulated.

A variable diaphragm such as the one mentioned above is used in small size piezoelectric vibrators. Accordingly, as compared to a variable diaphragm using an electromagnetic actuator which is used in a normal still camera, it is possible to reduce the size substantially. Therefore, it is easily applicable in an endoscope of a comparatively thicker diameter.

However, there are limitations on a size reduction of a stacked-layered piezoelectric vibrator, which is necessary for achieving a displacement amount in an inertial drive. Furthermore, for driving the diaphragm, a rotating plate linked to the diaphragm blade becomes necessary. Therefore, it is difficult to use the stacked-layered piezoelectric vibrator in an endoscope of a small diameter.

SUMMARY OF THE INVENTION

The present invention is made in view of the abovementioned issues, and an object of the present invention is to provide an optical diaphragm apparatus, and particularly an optical diaphragm apparatus which is applicable particularly in an endoscope of a small diameter.

To solve the issues mentioned above, and to achieve the object, according to the present invention, it is possible to provide an optical diaphragm apparatus including, a diaphragm ring which includes an optical aperture, a diaphragm member which includes a rotating shaft, a driving shaft, and a shielding section, an actuator which is coupled with the driving shaft, and which rotates the diaphragm member around the rotating shaft as a center, and a controlling member which controls the actuator.

The actuator is formed of an elastic member, and has a circular arc shape.

The controlling member changes an chord length of the actuator.

The shielding section is displaced due to a change in a relative position of the driving shaft with which the actuator is coupled, with respect to the rotating shaft, which is caused due to a change in the chord length of the actuator.

An aperture diameter of the optical aperture is changed by shielding of a part of the optical aperture by the shielding section, due to rotation of the diaphragm member around the rotating axis as the center.

Moreover, according to a preferable aspect of the present invention, it is desirable that one end of the actuator having the circular arc shape is coupled with the driving shaft, and the other end of the actuator is coupled with a member which is fixed to the diaphragm ring.

Furthermore, according to another preferable aspect of the present invention, it is desirable that the diaphragm member is formed by disposing a pair of diaphragm members which is made of two members, and two ends of the actuator having the circular arc shape are coupled with the driving shaft of the diaphragm members respectively.

According to still another preferable aspect of the present invention, it is desirable that an end portion of the actuator having the circular shape is rotatably coupled with the driving shaft of the diaphragm member.

Moreover, according to still another preferable aspect of the present invention, it is desirable that an end portion of the actuator having the circular arc shape is rotatably coupled with the member which is fixed to the diaphragm ring.

Furthermore, according to still another aspect of the present invention, it is desirable that the actuator having the circular arc shape is formed of a high-polymer material which contains ions, and a pair of electrodes is formed on a first surface on a central side of a circular arc, and on a second surface which faces the first surface, and the chord length is changed by moving the ions (contained in the high-polymer material) by applying a voltage between the electrodes, by the controlling member.

Moreover, according to the present invention, it is possible to provide an optical diaphragm apparatus including a diaphragm ring which includes an optical aperture, a diaphragm member which includes a rotating shaft, a driving shaft, and a shielding section, an actuator which is coupled with the driving shaft, and which rotates the diaphragm member around the rotating shaft as a center, and a controlling member which controls the actuator.

The actuator is formed of an elastic member, and has a shape along the optical aperture.

The controlling member changes a distance between two predetermined points on the shape along the optical aperture of the actuator.

The shielding section is displaced due to a change in a relative position of the driving shaft with which the actuator is coupled, with respect to the rotating shaft, which is caused due to a change in the distance between the two predetermined points on the shape along the optical aperture of the actuator.

An aperture diameter of the optical aperture is changed by shielding of a part of the optical aperture by the shielding section, due to rotation of the diaphragm member around the rotating axis as the center.

DETAILED DESCRIPTION OF THE INVENTION

Embodiments of an optical diaphragm apparatus according to the present invention will be described below in detail with reference to the accompanying diagrams. However, the present invention is not restricted by these embodiments.

FIRST EMBODIMENT

Figure 1:
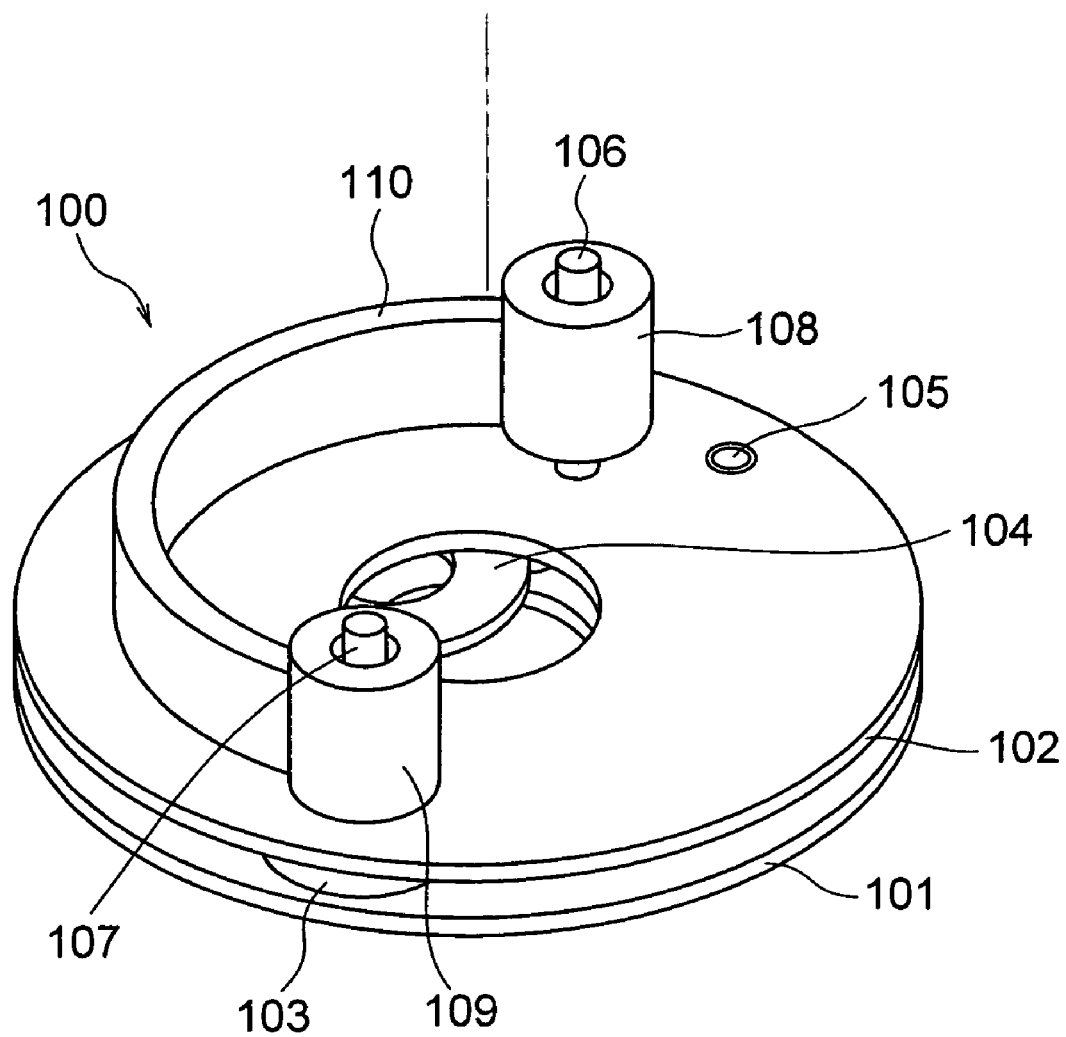
FIG. 1 is a diagram showing a perspective view of an optical diaphragm apparatus according to a first embodiment of the present invention.

A first embodiment of the present invention will be described by referring to FIG. 1 to FIG. 9. FIG. 1 shows a perspective view of an optical diaphragm apparatus 100 according to the first embodiment. An upper substrate 101 and a lower substrate 102 are disposed facing mutually while maintaining a fixed gap by a spacer 103. A diaphragm member 104 is disposed in a gap between the two substrates.

The diaphragm member 104 is rotatable in a direction along a principal plane of the upper substrate 101 and the lower substrate 102, with a rotating shaft 105 as a center. Moreover, a driving shaft 106 which is fixed to the diaphragm member 104, and a fixed shaft 107 which is fixed to the spacer 103 are projected from the upper substrate 101.

An ion conducting high-polymer member 110 includes two electrodes on two surfaces facing mutually, and has a circular arc shape. The ion conducting high-polymer member 110 corresponds to an actuator. Ring shaped members 108 and 109 are fixed to arc ends on both sides of the ion conducting high-polymer member 110. Moreover, the driving shaft 106 is inserted into the ring shaped member 108. Furthermore, the fixed shaft 107 is inserted into the ring shaped member 109.

Figure 2:
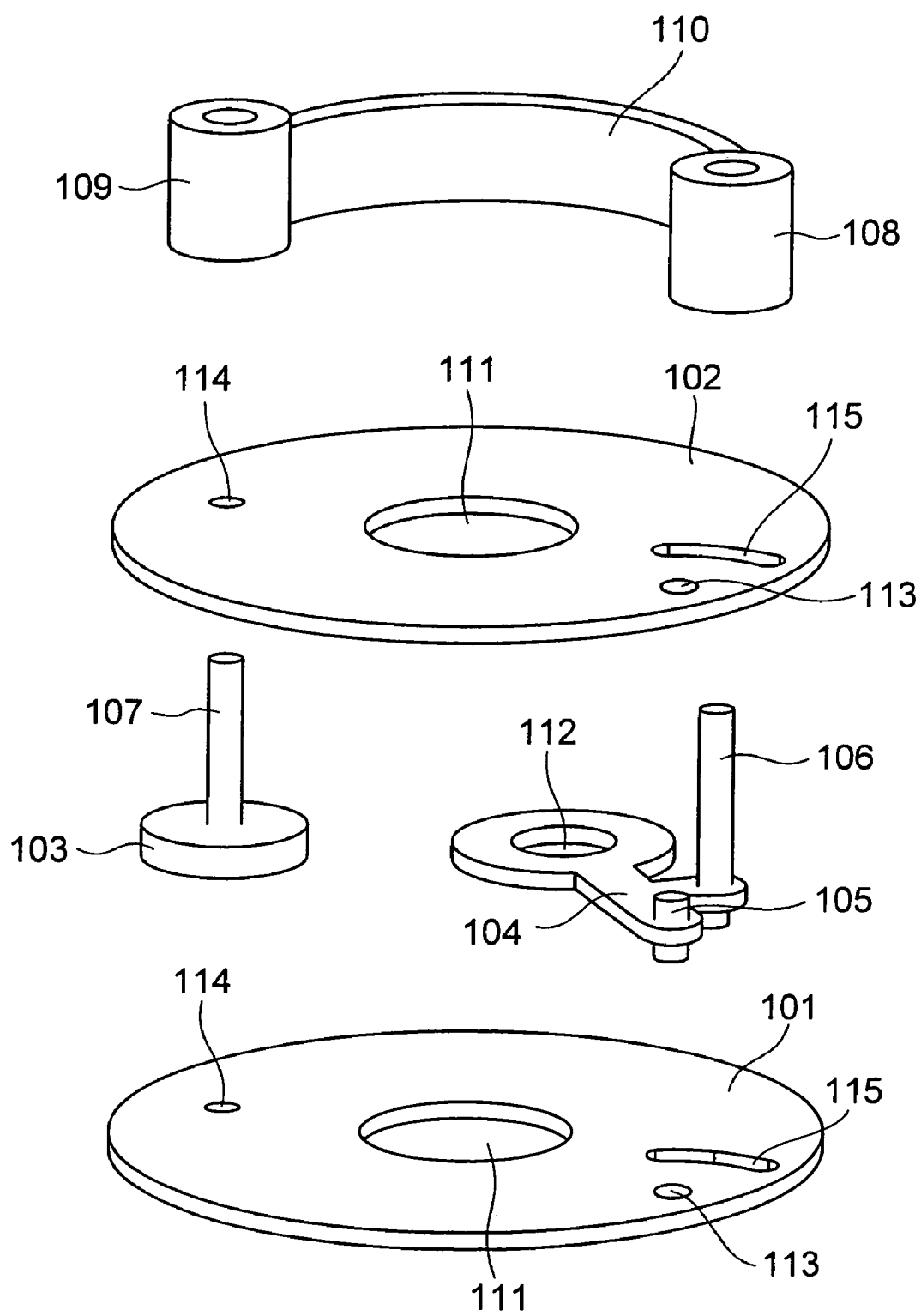
FIG. 2 is a diagram showing a perspective view when the optical diaphragm apparatus in the first embodiment is disassembled.
Figure 3:
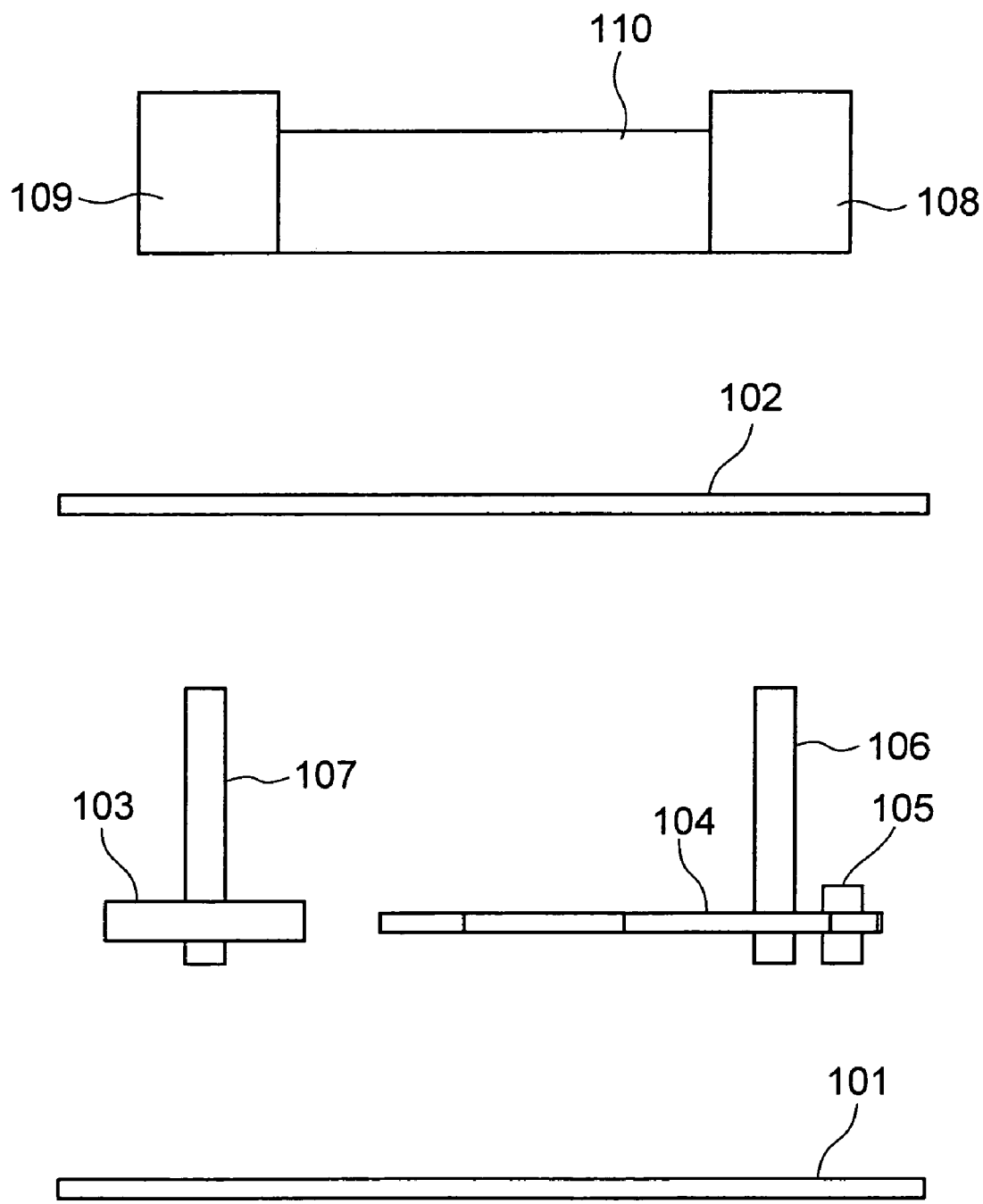
FIG. 3 is a diagram showing a cross-sectional view when the optical diaphragm apparatus in the first embodiment is disassembled.

Next, an assembly of each component in the first embodiment will be described by referring to FIG. 2 and FIG. 3 which are exploded views of the optical diaphragm apparatus 100. FIG. 2 shows a perspective view, and FIG. 3 shows a side view (cross-section).

An aperture 111 which becomes an optical aperture at the time of opening, a rotating shaft hole 113 through which the rotating shaft 105 is inserted, a fixed shaft hole 114 through which the fixed shaft 107 is inserted, and a driving shaft hole 115 having a circular arc shape, through which the driving shaft 106 is passed, are formed in the upper substrate 101 and the lower substrate 102. The upper substrate 101 and the lower substrate 102 correspond to a diaphragm ring.

The rotating shaft 105 and the driving shaft 106 are assembled by press-fitting in the diaphragm member 104 in the form of a plate. Moreover, an aperture 112 which becomes an optical aperture at the time of narrowing is formed in the diaphragm member 104. Furthermore, the fixed shaft 107 is press-fitted in the spacer 103. Moreover, the rotating shaft 105 and the driving shaft 106 are projected on an upper portion of the upper substrate 101. Furthermore the ring shaped members 108 and 109 are inserted into these projections respectively.

Figure 4:
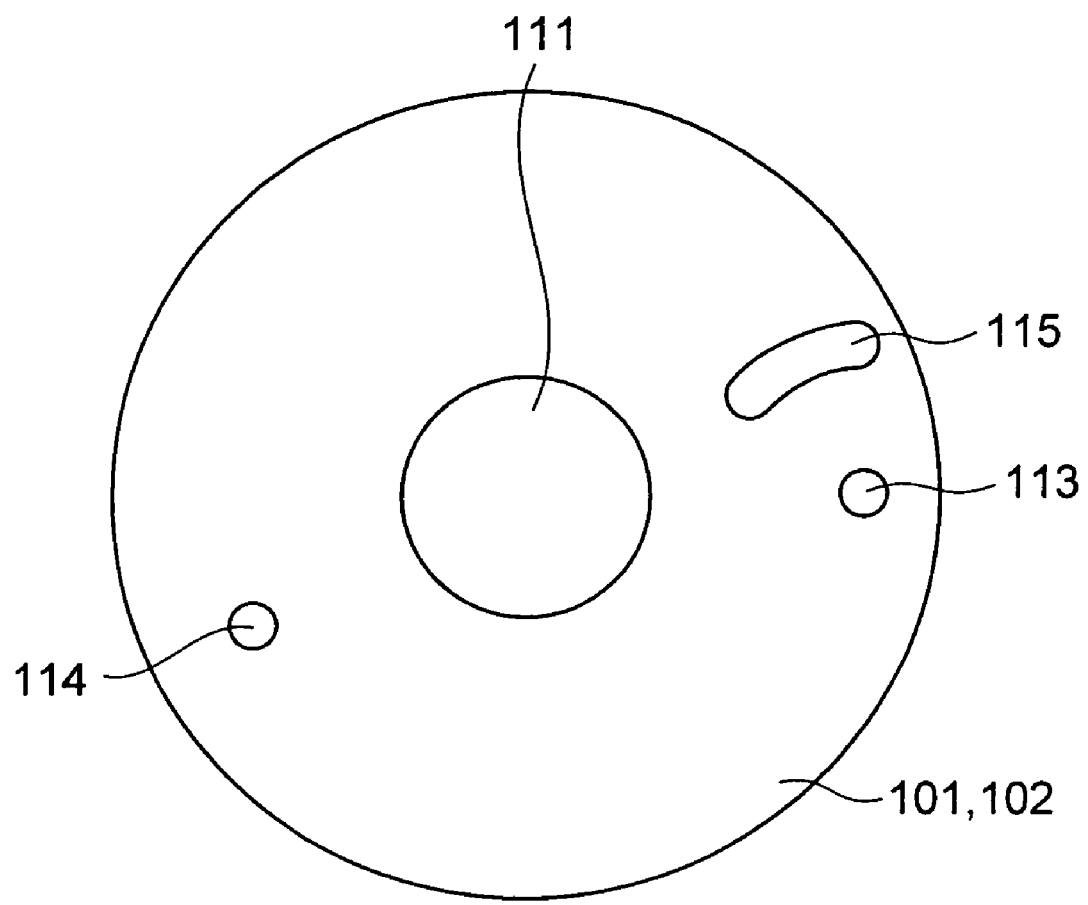
FIG. 4 is a diagram showing a schematic view of an upper substrate in the first embodiment.

FIG. 4 shows a view of the upper substrate 101 and the lower substrate 102 as seen from a top. Here, a diameter of the rotating shaft hole 113 is formed to be slightly more than a diameter of the rotating shaft 105 of the diaphragm member 104. Moreover, a width of the circular arc shaped driving shaft hole 115 is formed to be slightly more than a diameter of the driving shaft 106 of the diaphragm member 104. Therefore, the diaphragm member 104 is rotatable in a predetermined range which is regulated by a length of the circular arc shaped driving shaft hole 115 around the rotating shaft 105 as a center.

Figure 5:
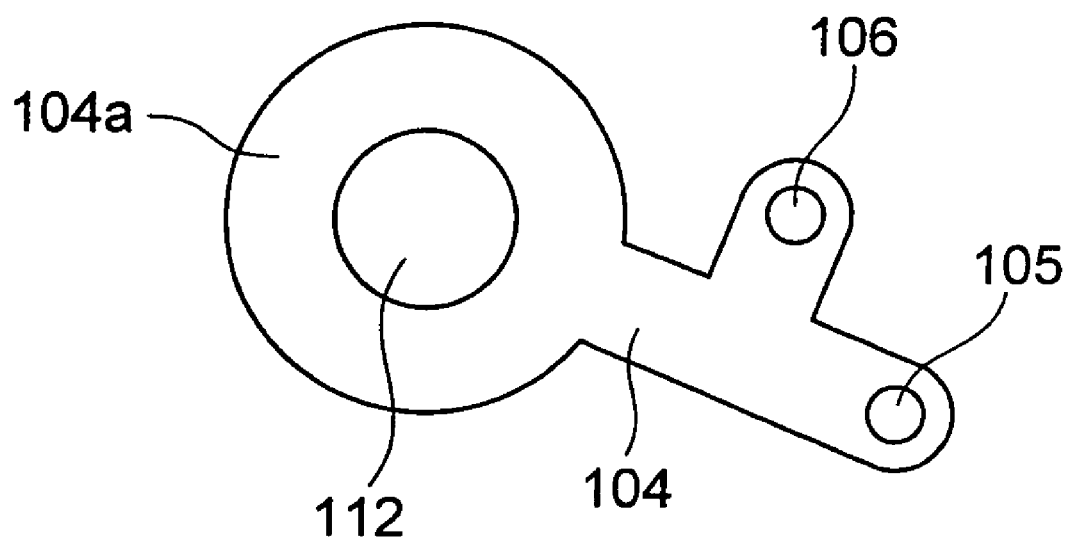
FIG. 5 is a diagram showing a schematic view of a diaphragm member in the first embodiment.

FIG. 5 shows a view of a top surface of the diaphragm member 104. A diameter of a circular ring section 104a of the aperture 112 is formed to be slightly more than the aperture 111 of the lower substrate 102 and the upper substrate 101.

Figure 6:
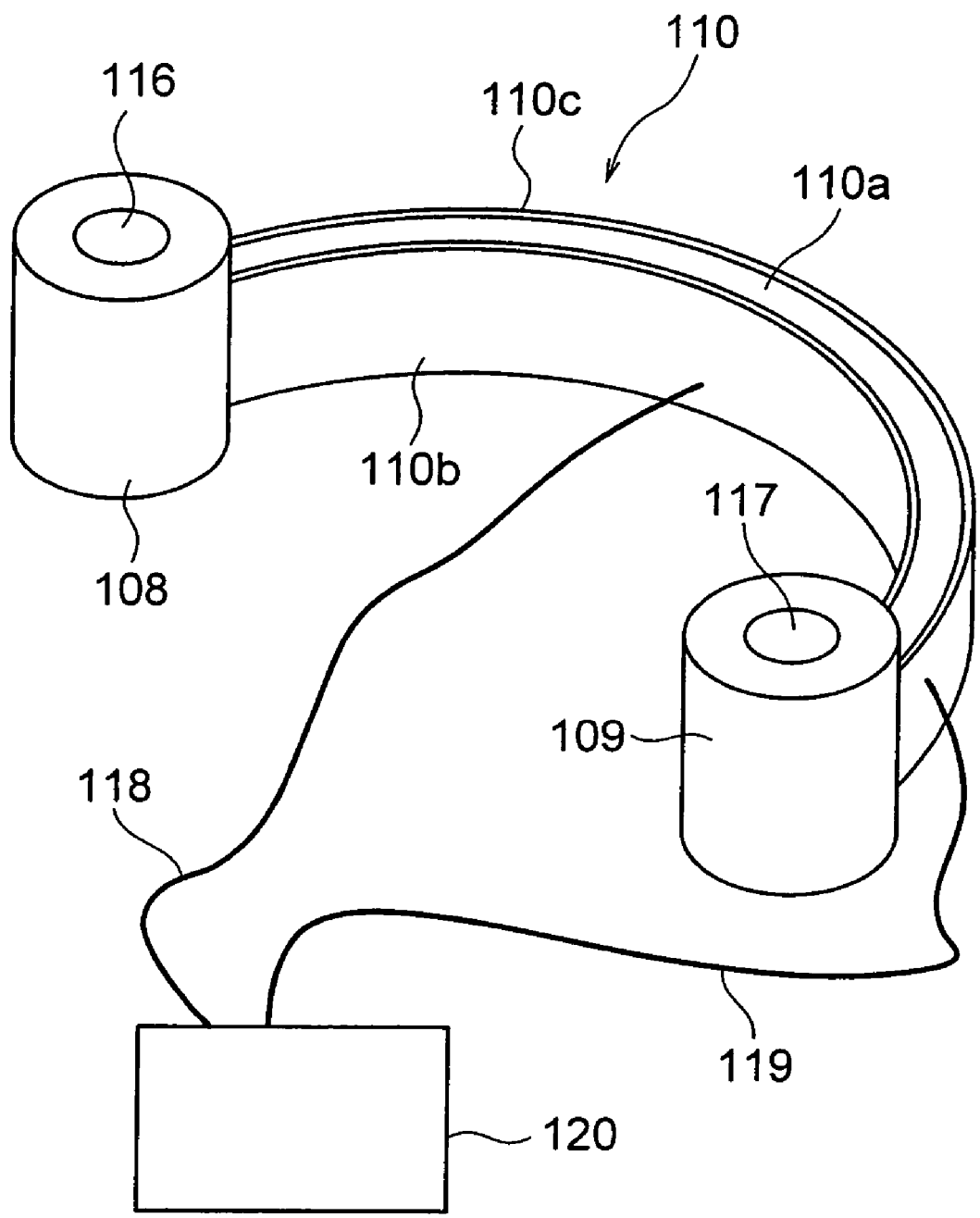
FIG. 6 is a diagram showing a schematic view of an ion conducting high-polymer member in the first embodiment.

Next, a detail formation near the ion conducting high-polymer member 110 which is the actuator will be described by referring to FIG. 6. The ion conducting high-polymer member 110 has a circular arc shape with electrodes formed on two mutually facing surfaces. The ion conducting high-polymer member 110 is a three-layered structure of an ion-containing polymer 110a which becomes a circular arc shaped substrate, a first electrode 110b which is provided on a first surface at a central side of the circular arc shape, and a second electrode 110c which is provided on a second surface, facing the first electrode 110b.

On both ends of the circular arc shape, the ring shaped member 108 and the ring shaped member 109 are assembled. As it has been shown schematically in the diagram, a lead wire 118 and a lead wire 119 which are extra fine are connected to the first electrode 110b and the second electrode 110c respectively. The lead wire 118 and the lead wire 119 are connected to an external voltage source 120.

The external voltage source 120 outputs a predetermined voltage. When an electric potential difference is imparted between the first electrode 110b and the second electrode 110c by the predetermined voltage, positive ions of the ion containing polymer 110a are moved toward a cathode side. As a result, the cathode side of the ion containing polymer 110a is swelled. Due to the swelling of the cathode side of the ion containing polymer 110a, a curvature of the circular arc shape is changed. Accordingly, a chord length of the circular arc shaped ion conducting high-polymer member 110 is changed. The external voltage source 120 corresponds to a controlling member.

Thus, in the first embodiment, it is possible to change the chord length of the ion conducting high-polymer member 110 by an output voltage of the external voltage source 120. Moreover, as it has been mentioned above, a diameter of a through hole 116 in the ring shaped member 108 is slightly more than a diameter of the fixed shaft 107. Similarly, a diameter of a through hole 117 is slightly more than a diameter of the driving shaft 106. Therefore, the ring shaped member 108 is rotatable with respect to the fixed shaft 107. Similarly, the ring shaped member 109 is rotatable with respect to the driving shaft 106.

Next, an operation of a diaphragm mechanism in the first embodiment will be described by referring to FIG. 7, FIG. 8, and FIG. 9. To make easy the understanding of the movement of the diaphragm member 104, a state in which the upper substrate 101 is omitted is shown in the diagram. Moreover, it is not shown particularly in the diagram, but the extra fine lead wires mentioned above are connected to the first electrode 110b and the second electrode 110c respectively of the ion conducting high-polymer member 110. Moreover, the lead wires are let to be connected to an external voltage supply.

Figure 7:
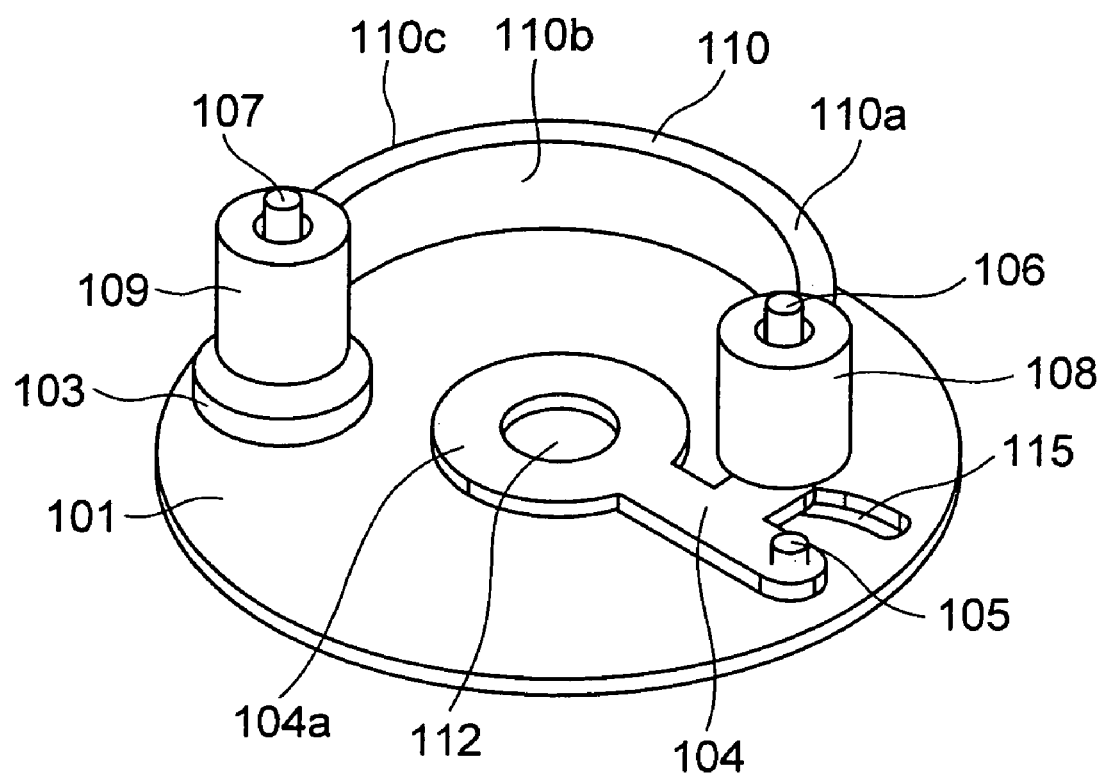
FIG. 7 is a diagram showing a detail structure near the ion conducting high-polymer member in the first embodiment.

FIG. 7 shows a state when a negative voltage is applied to the first electrode 110b and a positive voltage is applied to the second electrode 110c. A side of the ion containing polymer 110a toward the second electrode 110c is swelled, and the chord length of the ion conducting high-polymer member 110 becomes short. Accordingly, the driving shaft 106 is allowed to be displaced such that a distance from the fixed shaft 107 becomes smaller. As a result, the circular ring section 104a of the diaphragm member 104 is moved to a position which covers the aperture 111 of the lower substrate 102. At this time, the aperture diameter is regulated by the aperture 112. The circular ring section 104a corresponds to a shielding section.

Figure 8:
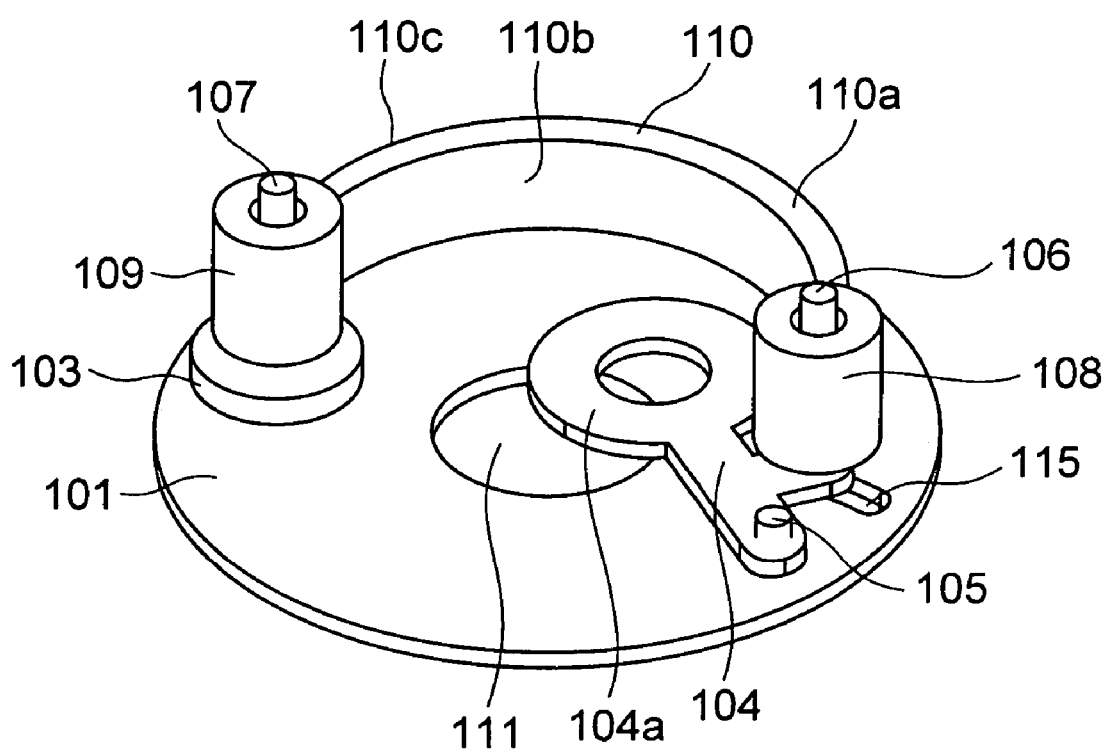
FIG. 8 is another diagram showing the detail structure near the ion conducting high-polymer member in the first embodiment.

FIG. 8 shows a state in which the first electrode 110b and the second electrode 110c are let to be at the same electric potential. In this state, the chord length of the ion conducting high-polymer member 110 becomes more than the chord length in the state in FIG. 7. Therefore, the circular ring section 104a of the diaphragm member 104 is moved to a position which covers partially the aperture 111 of the lower substrate 102.

Figure 9:
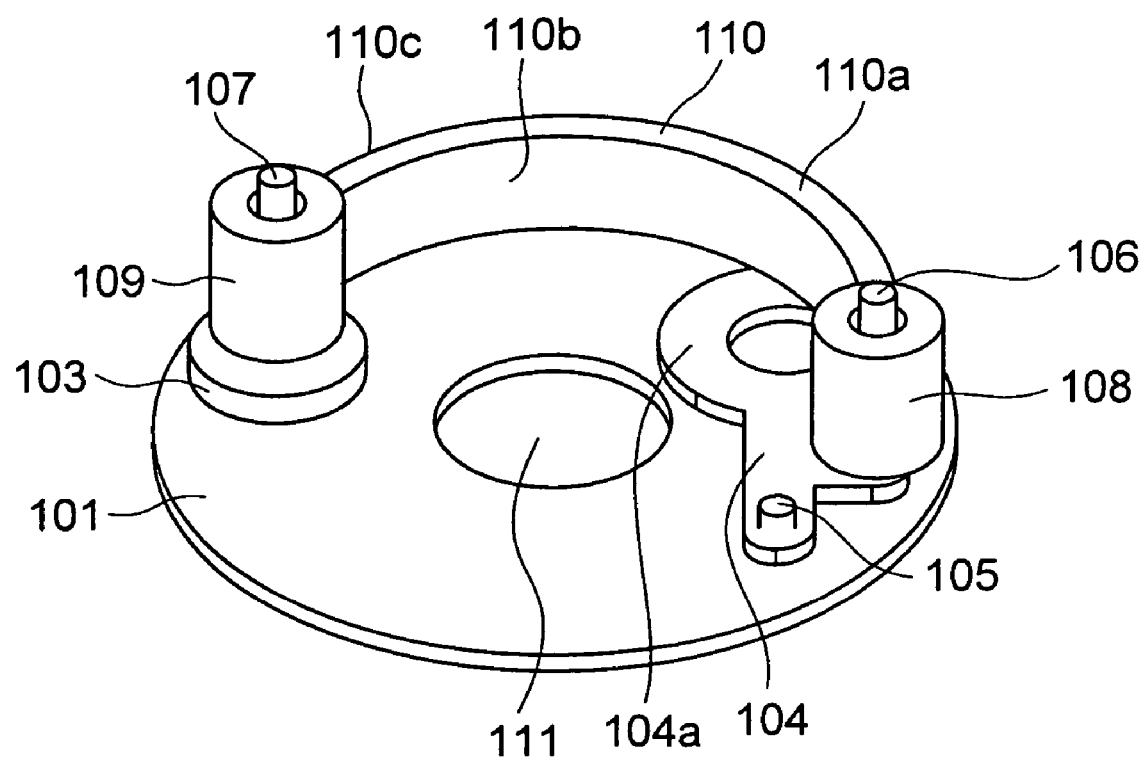
FIG. 9 is a still another diagram showing the detail structure near the ion conducting high-polymer member in the first embodiment.

FIG. 9 shows a state when the positive voltage is applied to the first electrode 110b and the negative voltage is applied to the second electrode 110c. At this time, a side of the ion containing polymer 110a toward the first electrode 110b is swelled, and the chord length of the ion conducting high-polymer member 110 becomes long. Accordingly, the driving shaft 106 is allowed to be displaced such that the distance from the fixed shaft 107 becomes long. As a result, the circular ring section 104a of the diaphragm member 104 is moved to a position which is retracted from the aperture 111 of the lower substrate 102. At this time, the aperture diameter is regulated by the aperture 112.

Thus, in the first embodiment, only by reversing the polarity (positive and negative) of the voltage applied to the first electrode 110b and the second electrode 110c, it is possible to switch the diaphragm aperture between the diameter of the aperture 111 and the diameter of the aperture 112. The actuator in the first embodiment has a very simple structure as shown in FIG. 6. Moreover, as compared to conventional methods in which an inertial drive piezoelectric actuator and a rotating actuator of an electromagnetic rotary solenoid are used, it is possible to reduce substantially a size of the actuator in the first embodiment.

Furthermore, advantages of the first embodiment will be described below. At the time of switching the aperture diameter by a rotational movement of the diaphragm member 104, the distance between the fixed shaft 107 and the driving shaft 106 may just be changed. Therefore, in the first embodiment, there is an advantage that it is possible to use an expanding and contracting actuator or a bending actuator having a simple structure rather than the rotating actuator.

Moreover, in the first embodiment, a change in the chord length due to bending of the circular arc shaped actuator is used. Therefore, as compared to a case of using the expansion and contraction of a simple rod shaped actuator or a plate shaped actuator, there is an advantage that it is possible to have a substantial displacement by a small distortion. This advantage becomes remarkable particularly in a case of using an actuator which is displaced by a distortion of a material, such as an ion conducting actuator.

Furthermore, in the first embodiment, since the ion conducting high-polymer member 110 (actuator) has the circular arc shape, it is easy to dispose the ion conducting high-polymer member 110 along a peripheral portion of a diaphragm mechanism. Consequently, there is an advantage that it is possible to improve a degree of freedom of disposing the driving shaft 106 and the fixed shaft 107 for the diaphragm aperture 111 not being shielded by the ion conducting high-polymer member 110.

Moreover, the ring shaped members 108 and 109 which are disposed on both sides of the ion conducting high-polymer member 110 are rotatably assembled with respect to the fixed shaft 107 and the driving shaft 106. Therefore, there is an advantage that in a case of obtaining a rectilinear displacement by a curved change (curvature change) of the circular arc shaped ion conducting high-polymer member 110, no substantial distortion is developed in the ion conducting high-polymer member 110 in an installation portion near the ring shaped members 108 and 109.

Furthermore, it is also possible to structure such that the ion conducting high-polymer member 110 is fixed with respect to one of the fixed shaft 107 and the driving shaft 106, and rotates freely with respect to the other shaft, and also let to have some degree of freedom of displacement in a direction orthogonal to the rectilinear direction. According to such structure, it is possible to achieve an effect similar to not developing a substantial distortion in the ion conducting high-polymer member 110. It is possible to realize this effect by letting apertures of the ring shaped members 108 and 109 to be elliptical apertures in a direction orthogonal to the direction of the rectilinear displacement, and not circular apertures.

The advantage that the substantial distortion is not developed, is achieved similarly also in a case in which the driving shaft 106 and the spacer 103 are assembled to rotate freely, and the driving shaft 106 is assembled to rotate freely with respect to the diaphragm member 104. Accordingly, it is possible to have a small opening and closing of the diaphragm. In other words, it is possible to reduce a force required for the rectilinear motion of the diaphragm member 104, to be extremely small. Therefore, it is possible to reduce a size, particularly a height of the ion conducting high-polymer member 110 (ion conducting actuator). As a result of this, it is possible to reduce a thickness of the optical diaphragm apparatus 100.

Moreover, in the first embodiment, the ion conducting actuator is used as an actuator. However, the actuator is not restricted to the ion conducting actuator, and it is possible to obtain some of the advantages provided that it is an actuator which can be machined to have a circular arc shape, and which is of a type which can be bent by a distortion of a material. A bimorph piezoelectric actuator and a shape memory alloy can be given as examples. However, the ion conducting actuator, as compared to the bimorph piezoelectric actuator and the shape memory alloy, has a small drive voltage, and a small shape can be obtained comparatively easily, and are particularly preferable for these points.

Next, dimensions of the optical diaphragm apparatus 100 of the first embodiment will be given below.

A diameter of the aperture 111 which regulates the aperture diameter at the time of opening the diaphragm . . . 0.64 mm A diameter of the aperture 112 which regulates the aperture diameter at the time of narrowing the diaphragm . . . 0.32 mm A distance from a center of the aperture 111 up to the rotating shaft 105 . . . 0.9 mm A distance between the rotating shaft 105 and the driving shaft 106 . . . 0.4 mm Moreover, at this time, an angle of rotation of the diaphragm member 104 which is necessary for the diaphragm member 104 to be retracted completely from the aperture 111 is 46 degrees. Moreover, when the angle of rotation is 23 degrees which an intermediate, a position of the driving shaft 106 is optimized such that a direction of displacement of the driving shaft 106, and a direction of the aperture 111, coincide perfectly. In this state, when the fixed axis 105 is disposed at a position symmetrical with respect to a center of the aperture 111, with respect to the position of the driving shaft 106, a distance between the fixed shaft 107 and the driving shaft 106 becomes 1.612 mm. This is a value when the angle of rotation is 23 degrees. Moreover, the distance between the fixed shaft 107 and the driving shaft 106 when the angle of rotation is zero degrees (when narrowed), and 46 degrees (when opened), is 1.457 mm and 1.769 mm respectively.

When the structure is designed such that when the angle of rotation is 23 degrees, an angle of circumference of the circular arc shaped ion conducting high-polymer member 110 becomes 180 degrees, a circumferential length becomes 2.533 mm. Here, a thickness of the ion conducting high-polymer member 110 (distance between the first electrode 101b and the second electrode 101c) is let to be 0.1 mm. Moreover, when a surface distortion when the bend (curvature) of the ion conducting high-polymer member 110 is changed, and the angle of rotation is changed from 0 degree (when narrowed) to 46 degrees (when diaphragm is opened) is calculated, the surface distortion is 1.20%.

Whereas, in a case of changing the distance between the fixed shaft 107 and the driving shaft 106 by a simple rod-shaped expanding and contracting actuator, the surface distortion of the rod-shaped expanding and contracting actuator is 19.4%. When the two surface distortions are compared, the surface distortion when the circular arc shaped ion conducting high-polymer member 110 is used, is a remarkably small value.

Thus, by using the circular arc shaped bending actuator, it is possible to drive the diaphragm at a very small distortion. Therefore, it is substantially advantageous from points of response and a wide scope of choice of the actuator. In a case of a normal bending actuator, with the same volume, a generative force is less than a generative force of the expanding and contracting actuator. However, in a diaphragm apparatus in which the purpose is served by displacing a diaphragm member only by a small amount, a point of the generative force does not become a major problem.

SECOND EMBODIMENT

Figure 10:
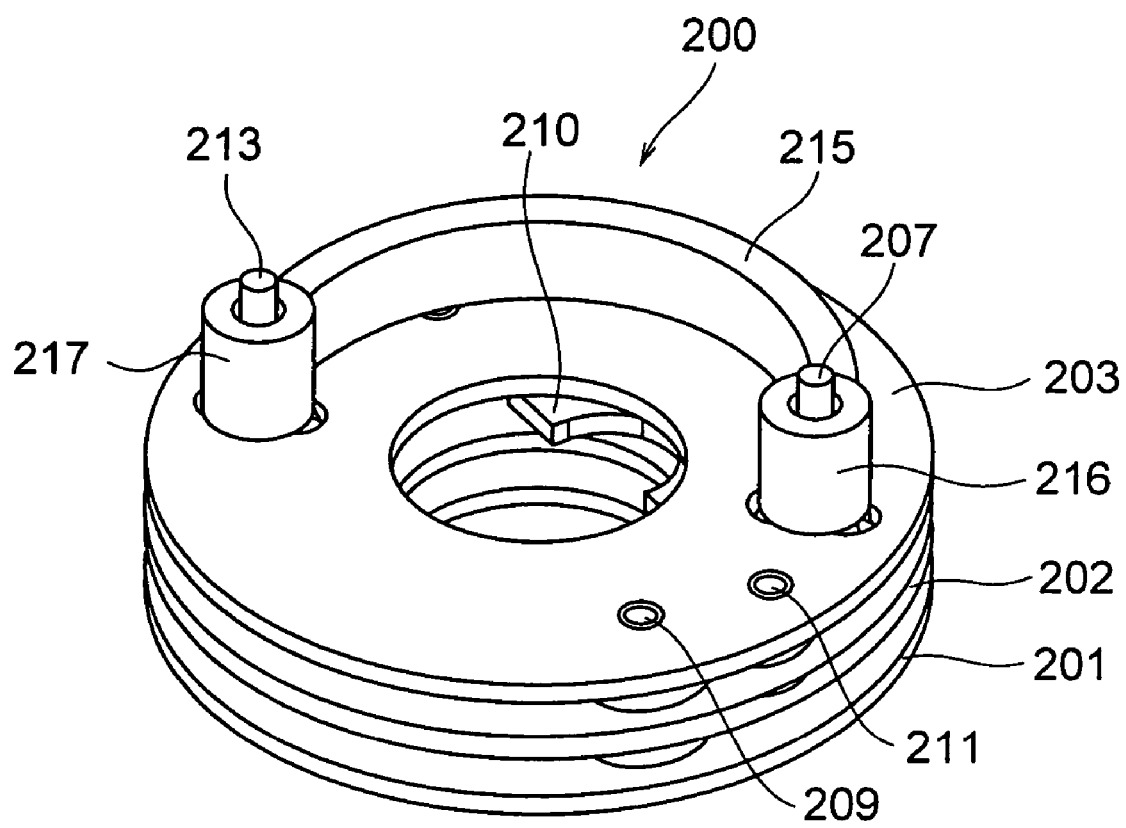
FIG. 10 is a diagram showing a perspective view of an optical diaphragm apparatus according to a second embodiment of the present invention.
Figure 11:
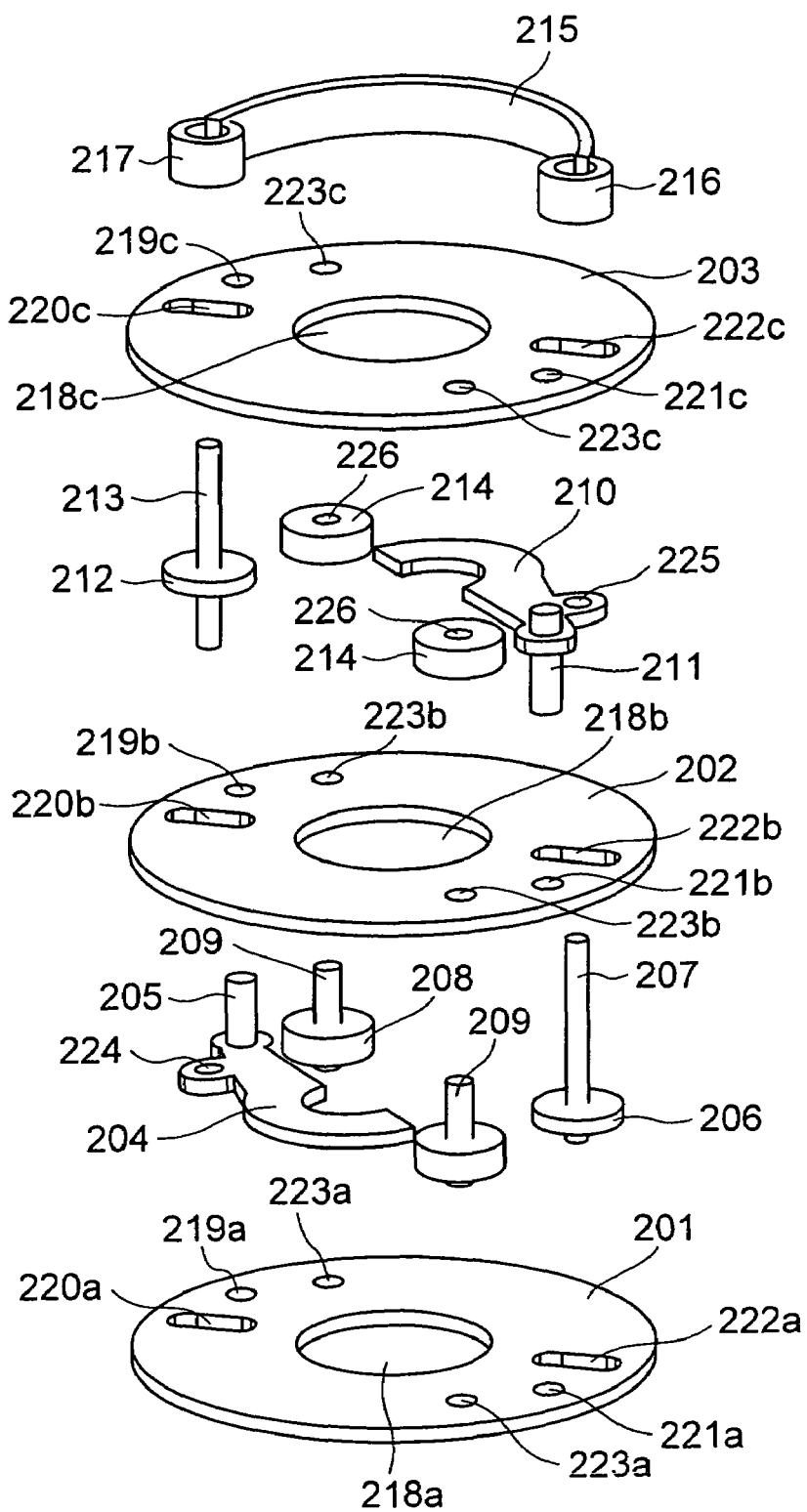
FIG. 11 is a diagram showing a perspective view when the optical diaphragm apparatus according to the second embodiment is disassembled.

Next, an optical diaphragm apparatus 200 according to a second embodiment of the present invention will be described by referring to FIG. 10 to FIG. 18. FIG. 10 shows a perspective view of the optical diaphragm apparatus 200 in the second embodiment. FIG. 11 shows a disassembled state of the optical diaphragm apparatus 200 in the second embodiment, to show a structure of the optical diaphragm apparatus 200. Same reference numerals are used for components which are same as in the first embodiment, and a description to be repeated is omitted.

Three substrates namely a lower substrate 201, and intermediate substrate 202, and an upper substrate 203 are stacked in layers. Regarding a gap between the three substrates, a gap between the lower substrate 201 and the intermediate substrate 202 is regulated by a pair of first spacers 208, and a gap between the intermediate substrate 202 and the upper substrate 203 is regulated by a pair of second spacers 214.

An actuator which drives a diaphragm mechanism is an ion conducting high-polymer member 215 having a circular arc shape, with electrodes formed on two sides facing mutually. A ring shaped member 216 and a ring shaped member 217 are fixed to arc ends on both sides of the ion conducting high-polymer member 215.

A diaphragm member is formed to be divided into two diaphragm members namely a first diaphragm member 204 which is disposed between the lower substrate 201 and the intermediate substrate 202, and a second diaphragm member 210 which is disposed between the intermediate substrate 202 and the upper substrate 203.

Two spacer shafts 209 are press-fitted in the first spacer 208. The spacer shafts 209 are inserted in a through hole 223a in the lower substrate 201 and a through hole 223b in the intermediate substrate 202. Moreover, the spacer shafts 209 are projected further upward toward the intermediate substrate 202, and are inserted in a through hole 226 formed in the second spacer 214, and a through hole 223c in the upper substrate 203.

Thus, positions of the lower substrate 201, the intermediate substrate 202, and the upper substrate 203 are regulated by the two spacer shafts 209. The two first spacers 208 are adhered to the lower substrate 201 and the intermediate substrate 202. The two second spacers 214 are adhered to the intermediate substrate 202 and the upper substrate 203. Moreover, apertures 218a, 218b, and 218c are formed at a central portion of the lower substrate 201, the intermediate substrate 202, and the upper substrate 203 respectively.

The first diaphragm member 204 and a second driving shaft ring 206 are disposed between the lower substrate 201 and the intermediate substrate 202. A first rotating shaft 205 is press-fitted in the first diaphragm member 204. Moreover, a second driving shaft 207 is press-fitted in the second driving shaft ring 206.

The first rotating shaft 205 is inserted through a rotating shaft hole 219a of the lower substrate 201, and a rotating shaft hole 219b of the intermediate substrate 202. The first rotating shaft 205 is projected further upward at a side of the intermediate substrate 202 and is inserted through a rotating shaft hole 219c of the upper substrate 203.

The second driving shaft 207 is inserted through a driving shaft hole 222a having a circular arc shape, of the lower substrate 201, and a driving shaft hole 222b having a circular arc shape, of the intermediate substrate 202. The second driving shaft 207 is projected further upward toward a side of the intermediate substrate 202 and is inserted through a rotating shaft hole 225 of the second diaphragm member 210. Moreover, the second driving shaft 207 is further inserted through a driving shaft hole 222c having a circular arc shape of the upper substrate 203 at an upper side of the second driving shaft 207, and is further projected upward and inserted through the ring shaped member 216.

The second diaphragm member 210 and a first driving shaft ring 212 are disposed between the intermediate substrate 202 and the upper substrate 203. A second rotating shaft 211 is press-fitted in the second diaphragm member 210. Moreover, a first driving shaft 213 is press-fitted in the first driving shaft ring 212.

The second rotating shaft 211 is inserted through a rotating shaft hole 221b in the intermediate substrate 202, and a rotating shaft hole 221c in the upper substrate 203. Moreover, the second rotating shaft 211 is projected further downward at a side of the intermediate substrate 202, and is inserted through a rotating shaft hole 221a in the lower substrate 201.

The first driving shaft 213 is inserted through a driving shaft hole 220b having a circular arc shape, in the intermediate substrate 202, and a driving shaft hole 220c having a circular arc shape, in the upper substrate 203. Moreover, the first driving shaft 213 is projected further downward at the side of the intermediate substrate 202, and is inserted through a driving shaft hole 224 in the first diaphragm member 204, and driving shaft hole 220a having a circular arc shape, in the lower substrate 201 further downward. Furthermore, the first driving shaft 213 is projected further upward at a side of the upper substrate 201, and is inserted through the ring shaped member 217.

Widths of the circular arc shaped driving shaft holes 222a, 222b, and 222c and a diameter of the driving shaft hole 225 of the second diaphragm member 210 are formed to be slightly more than a diameter of the second driving shaft 207.

Moreover, widths of the circular arc shaped driving shaft holes 220a, 220b, and 220c, and a diameter of the driving shaft hole 224 of the first diaphragm member 204 are formed to be slightly more than a diameter of the first driving shaft 213.

Furthermore, diameters of the rotating shaft holes 219a, 219b, and 219c are let to be slightly more that a diameter of the first rotating shaft 205 of the first diaphragm member 204. Moreover, diameters of the rotating shaft holes 221a, 221b, and 221c are let to be slightly more than a diameter of the second rotating shaft 211 of the second diaphragm member 210.

In the abovementioned structure, the first driving shaft 213 is displaced in a central direction of the upper substrate 203, along the circular arc shaped driving shaft hole 220c. Accordingly, the first diaphragm member 204 can be allowed to undergo rotational displacement along a principal plane of the lower substrate 201 with the first rotating shaft 205 as a center.

Moreover, the second driving shaft 207 is displaced in the central direction of the upper substrate 203, along the circular arc shaped driving shaft hole 222c. Accordingly, the second diaphragm member 210 can be allowed to undergo rotational displacement along a principal plane of the central substrate 202 with the second rotating shaft 211 as a center.

Next, an actuator portion for driving of the second embodiment will be described by referring to FIG. 12. The ion conducting high-polymer member 215 having the circular arc shape has a three layered structure of an ion-containing polymer 215a which becomes a circular arc shaped substrate, a first electrode 215b which is provided on a first surface at a central side of the circular arc shape, and a second electrode 215c which is provided on a second surface, facing the first surface at the central side of the circular arc shape.

On both ends of the ion conducting high-polymer member 215, the ring shaped member 216 and the ring shaped member 217 are assembled respectively. As it has been shown schematically in the diagram, a lead wire 229 and a lead wire 230 which are extra fine wires are connected to the first electrode 215b and the second electrode 215c respectively. The lead wires 229 and 230 are connected to an external voltage source 231.

The external voltage source 231 outputs a predetermined voltage. Due to the predetermined voltage, an electric potential difference is generated between the first electrode 215b and the second electrode 215c. Accordingly, positive ions of the ion containing polymer 215a are moved toward a cathode side. As a result, the cathode side of the ion containing polymer 215a is swelled. Due to the swelling of the cathode side, a curvature of the circular arc shaped ion conducting high-polymer member 215 is changed, and an chord length is changed. Accordingly, it is possible to change in a predetermined range, the chord length of the ion conducting high-polymer member 215 by the output voltage of the external voltage source 231.

Moreover, a diameter of a through hole 227 in the ring shaped member 216 is formed to be slightly more than a diameter of the second driving shaft 207. Similarly, a diameter of a through hole 228 in the ring shaped member 217 is formed to be slightly more than a diameter of the first driving shaft 213. Therefore, the ring shaped member 216 is rotatable around the second driving shaft 207. Moreover, the ring shaped member 217 is rotatable around the first driving shaft 213.

According to this structure, it is possible to change the chord length of the ion conducting high-polymer material 215, and to displace the first driving shaft 213 along the circular arc shaped driving shaft hole 220c. Similarly, it is possible to displace the second driving shaft 207 along the circular arc shaped driving shaft hole 222c. Accordingly, it is possible to rotate the first diaphragm member 204 around the first rotating shaft 205 as a center. Similarly, it is possible to rotate the second diaphragm member 210 around the second rotating shaft 211 as a center.

Figure 13:
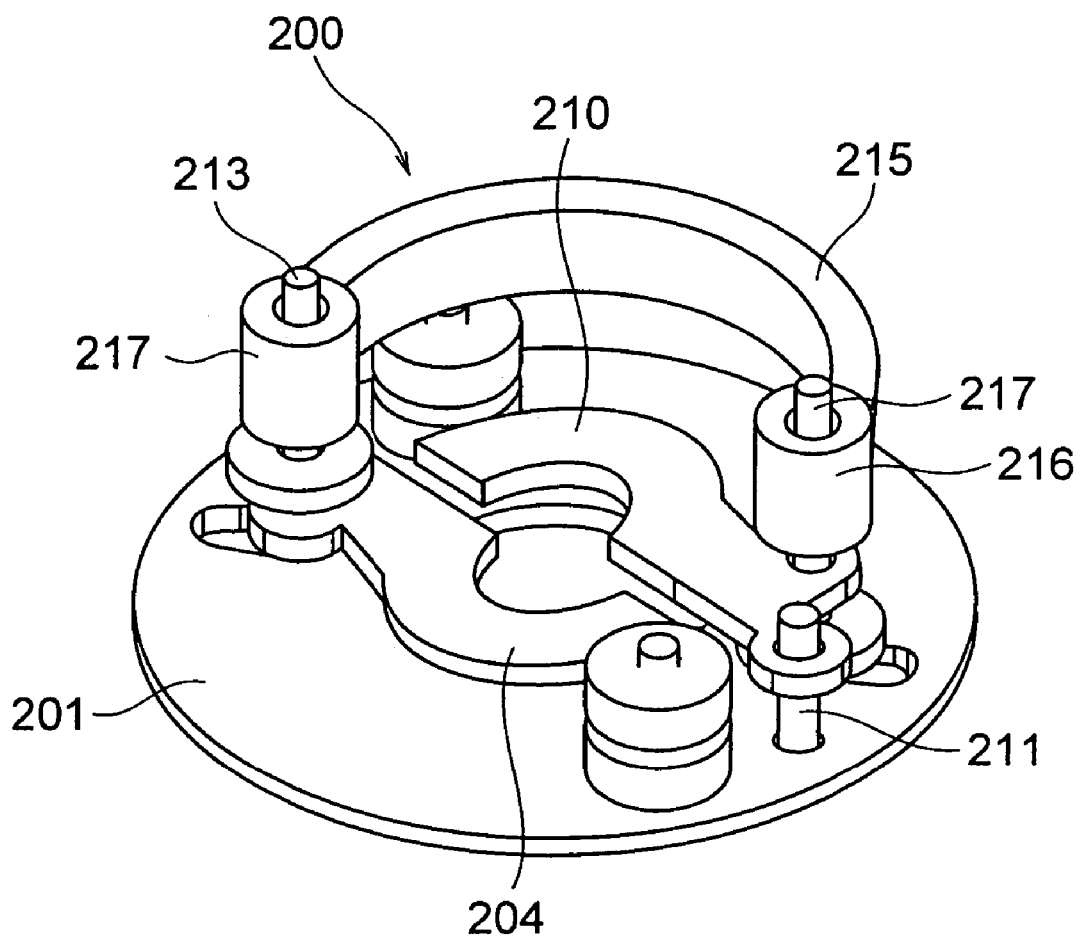
FIG. 13 is a diagram showing a perspective view of a narrowed state in the second embodiment.
Figure 14:
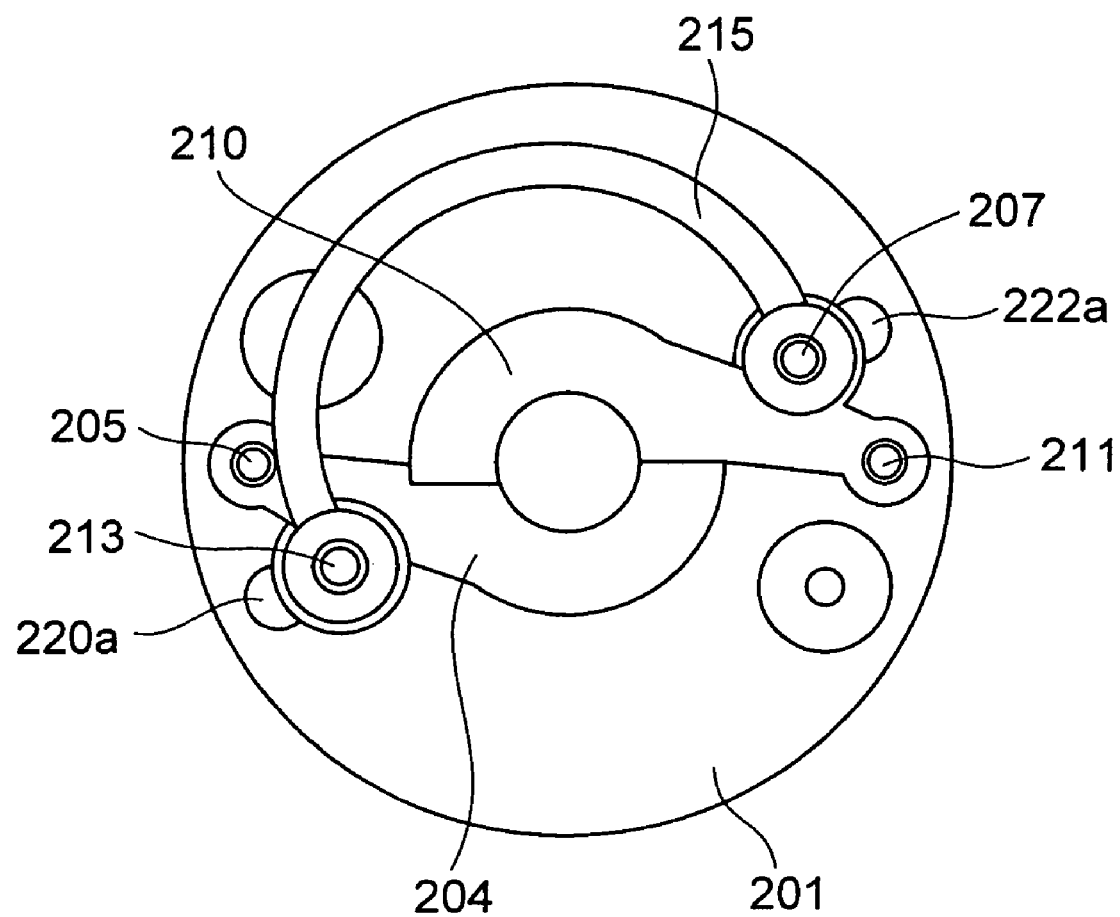
FIG. 14 is a diagram of a top view of the narrowed state in the second embodiment.
Figure 15:
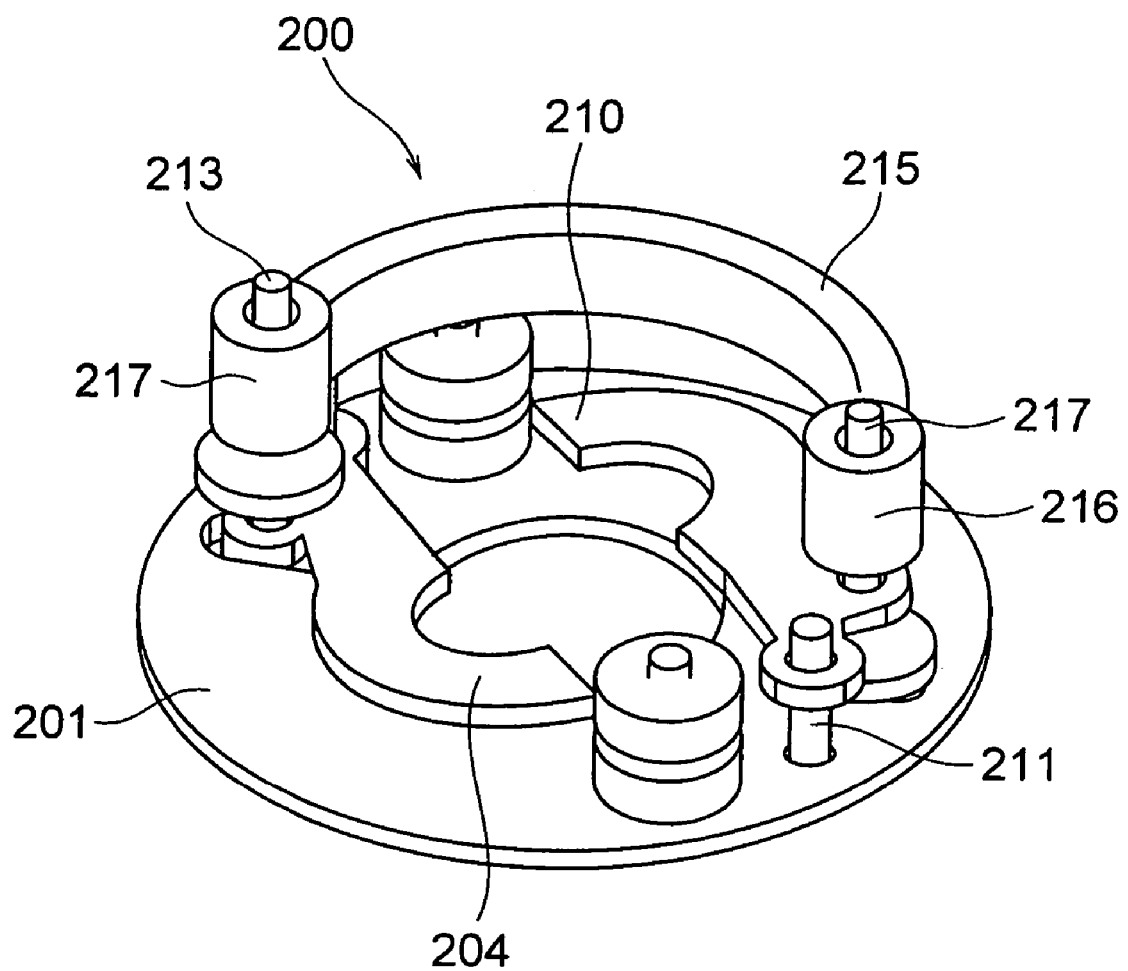
FIG. 15 is a diagram showing a perspective view of an intermediate state in the second embodiment.
Figure 16:
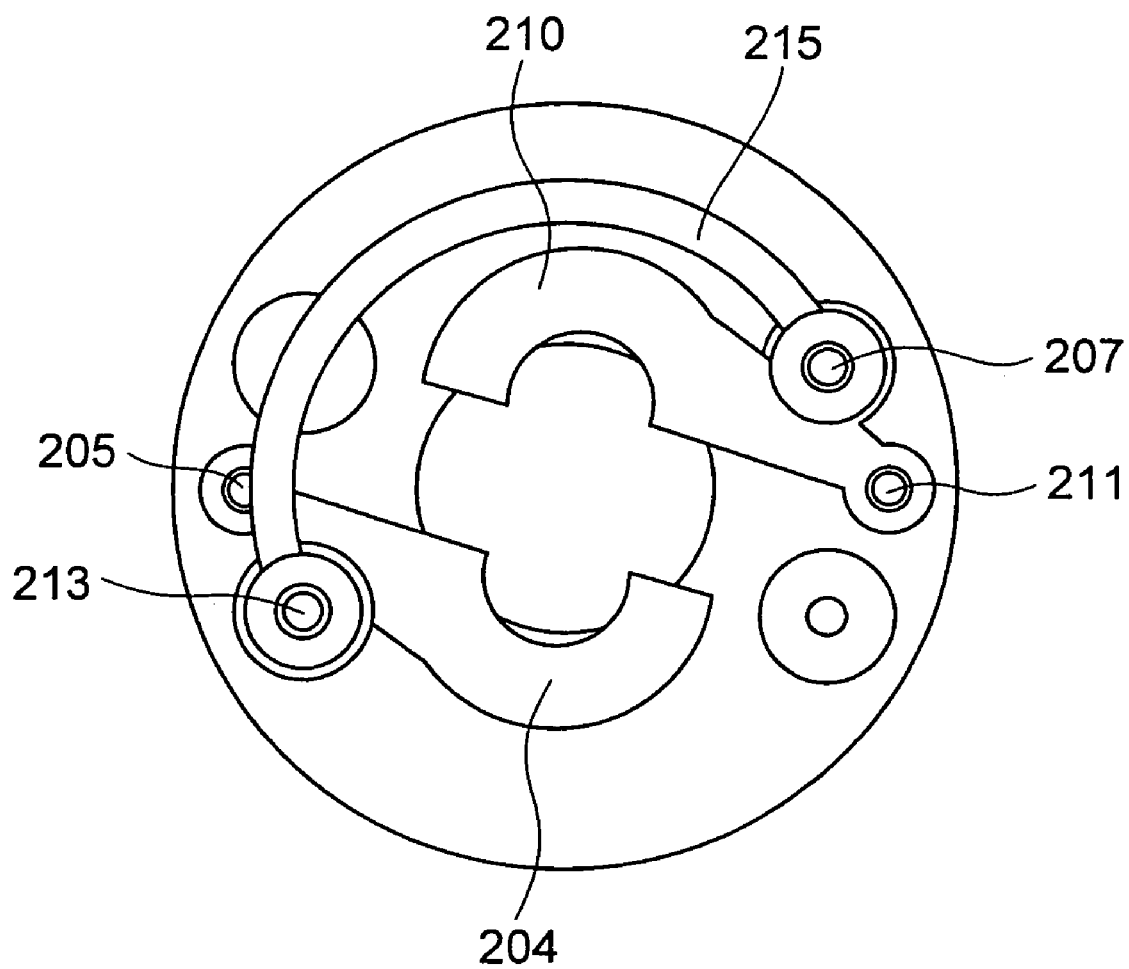
FIG. 16 is a diagram showing a top view of the intermediate state in the second embodiment.
Figure 17:
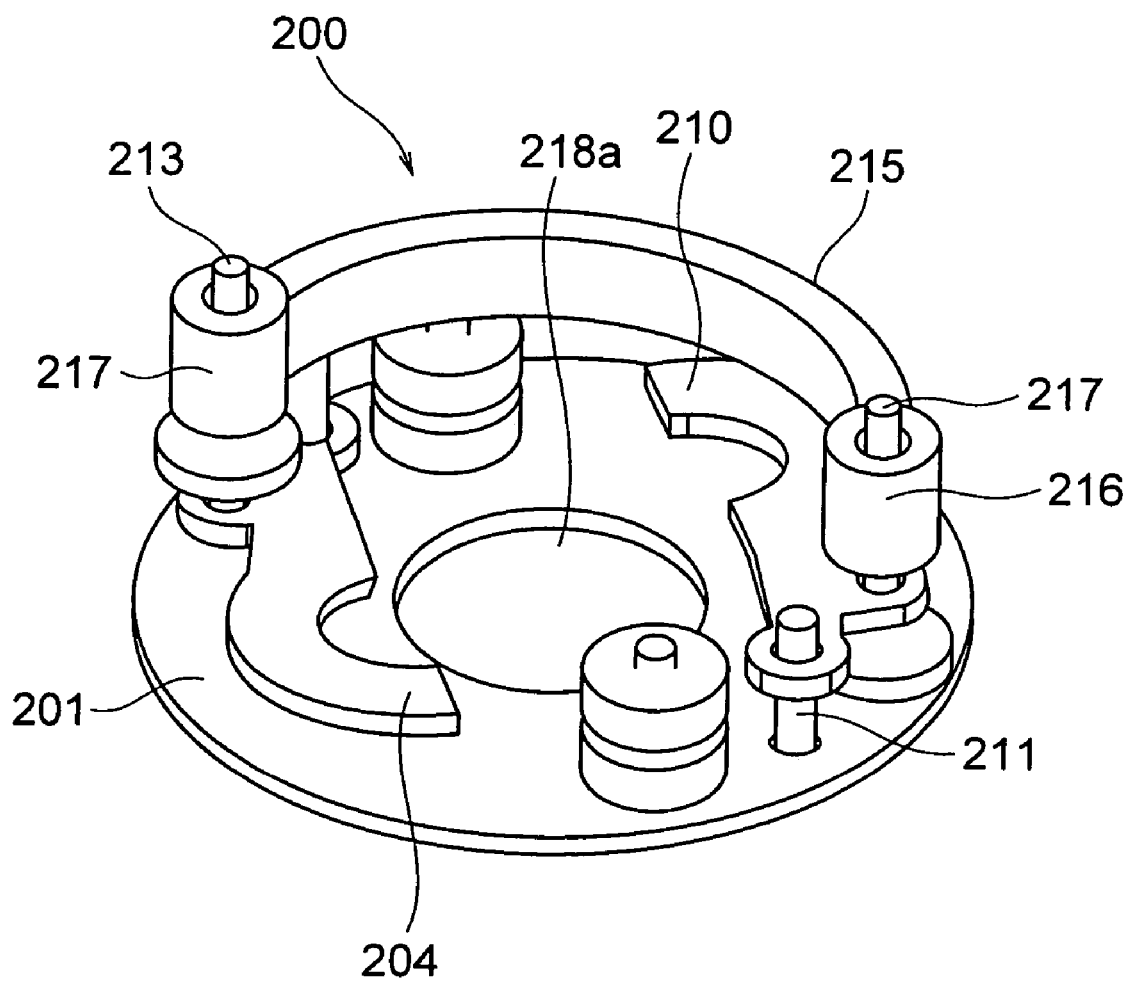
FIG. 17 is a diagram showing a perspective view of an opened state in the second embodiment.
Figure 18:
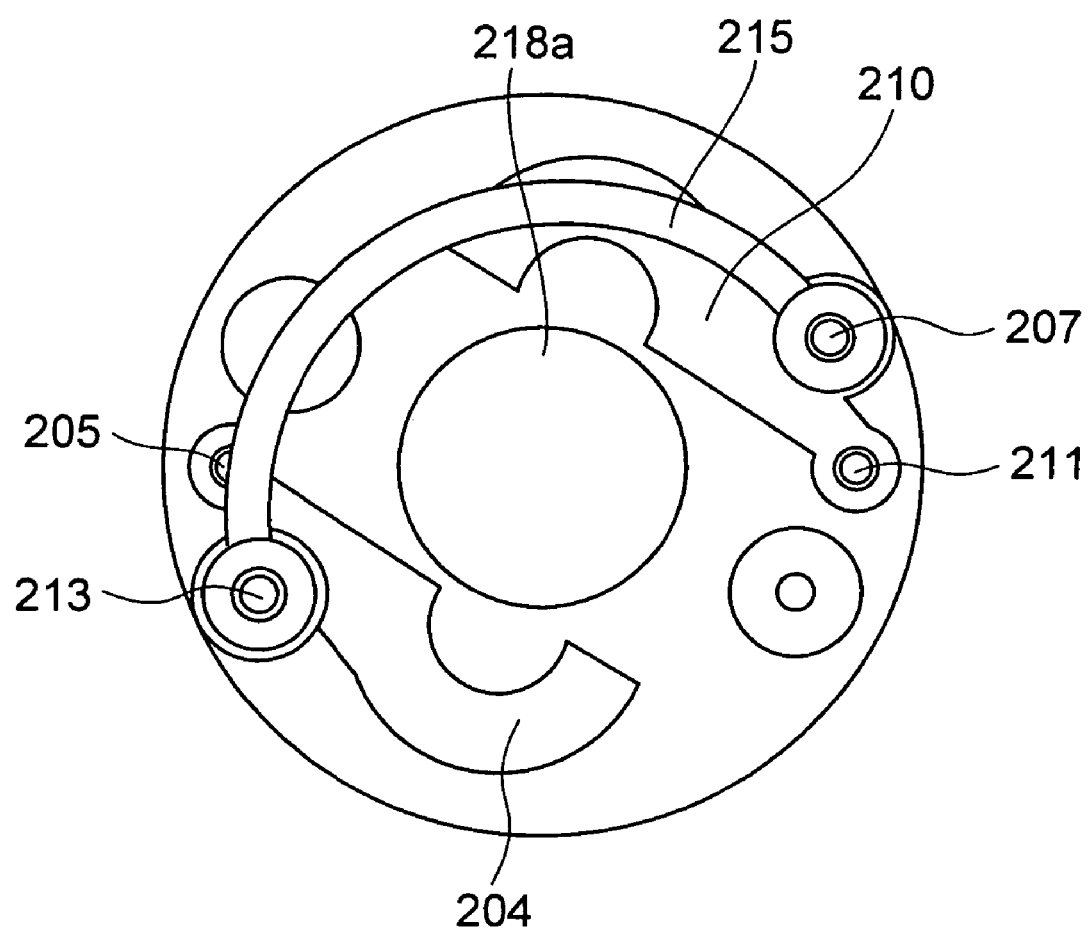
FIG. 18 is a diagram showing a top view of the opened state in the second embodiment.

Next, an operation of the optical diaphragm apparatus 200 of the second embodiment will be described by referring to FIG. 13 to FIG. 18. FIG. 13 shows a perspective view of a narrowed state. FIG. 14 shows a top view of the narrowed state. FIG. 15 shows a perspective view of an intermediate state. FIG. 16 shows a top view of the intermediate state. FIG. 17 shows a perspective view of an opened state. FIG. 18 shows a top view of the opened state.

In FIG. 13 to FIG. 18, to make a state of a diaphragm blade clearly visible, the intermediate substrate 202 and the upper substrate 203 are not shown in the diagram. Moreover, although it is not shown particularly in the diagram, the extra fine lead wires mentioned above are connected to the first electrode 215b and the second electrode 215c of the ion conducting high-polymer member 215. The lead wires are connected to an external voltage source.

FIG. 13 and FIG. 14 show a state when a negative voltage is applied to the first electrode 215b and a positive voltage is applied to the second electrode 215c. A side of the ion containing polymer 215a toward the second electrode 215c is swelled, and the chord length of the ion conducting high-polymer member 215 becomes short. Therefore, the ion conducting high-polymer member 215 is displaced such that a distance between the first driving shaft 213 and the second driving shaft 207 becomes short. As a result of this, an aperture diameter is regulated by a semicircular notch of the first diaphragm member 204 and a semicircular notch of the second diaphragm member 210.

FIG. 15 and FIG. 16 show a state in which the first electrode 215b and the second electrode 215c are let to be at the same electric potential. In this state, the chord length of the ion conducting high-polymer member 215 becomes more than the chord length in the state in FIG. 13 and FIG. 14. Therefore, the first diaphragm member 204 and the second diaphragm member 210 are in a state of partially covering the aperture 218a of the lower substrate.

Furthermore, FIG. 17 and FIG. 18 show cases in which the positive voltage is applied to the first electrode 215b and the negative voltage is applied to the second electrode 215c. The side of the ion containing polymer 215a toward the first electrode 215b is swelled, and the chord length of the ion conducting high-polymer member 215 is increased. Therefore, the ion conducting high-polymer member 215 is displaced such that the distance between the first driving shaft 213 and the second driving shaft 207 is increased. As a result of this, the first diaphragm member 204 and the second diaphragm member 210 are retracted from an upper portion of the aperture 218a of the lower substrate 201, and the aperture of the optical diaphragm apparatus 200 is regulated by the aperture 218a.

Thus, in the second embodiment, only be reversing the polarity (positive and negative) of the voltage applied to the first electrode 215b and the second electrode 215c, it is possible to switch the diaphragm aperture between a diameter of the aperture 218, and a diameter formed by the semicircular notch of the first diaphragm member 204 and the second diaphragm member 210.

Figure 12:
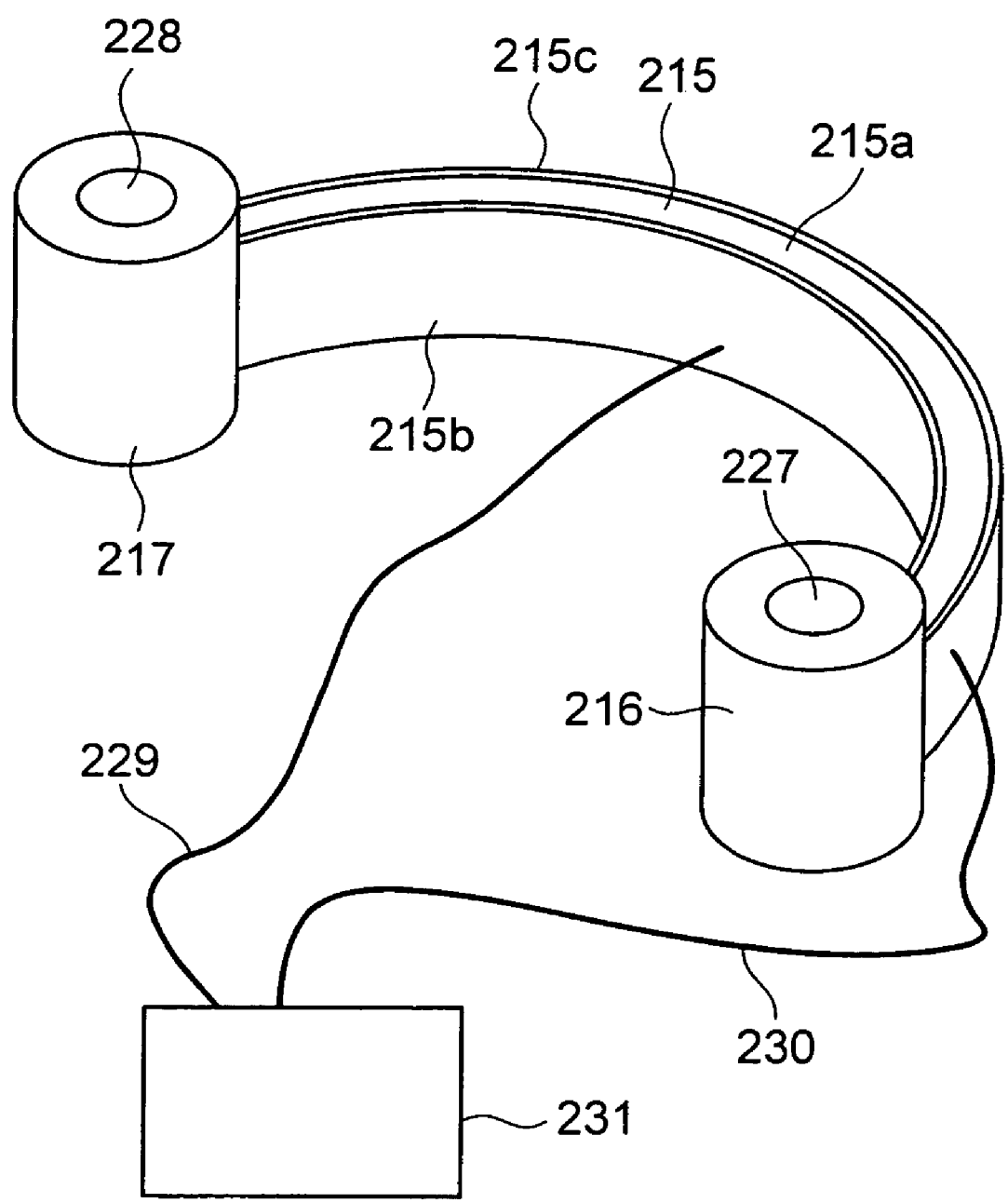
FIG. 12 is diagram showing a detail structure near the ion conducting high-polymer member in the second embodiment.

Moreover, the actuator has a very simple structure as shown in FIG. 12. Therefore, as compared to the conventional methods in which an inertial drive piezoelectric actuator and a rotating actuator of an electromagnetic rotary solenoid are used, it is possible to reduce substantially a size of the optical diaphragm apparatus 200 of the second embodiment.

Furthermore, in the second embodiment, the diaphragm member is formed by a pair of the first diaphragm member 204 and the second diaphragm member 210. Accordingly, it is possible to allow the first diaphragm member 204 and the second diaphragm member 210 to be retracted from an upper portion of the aperture 218 at even smaller angle of rotation.

Next, a numerical example of the second example will be given below. An aperture width when opened, which is regulated by the aperture 218 is 0.62 mm. Moreover, a diameter when the aperture is narrowed which is formed by the semicircular notches of the first diaphragm member 204 and the second diaphragm member 210, is 0.32 mm. These values are the same as the values in the first embodiment.

Furthermore, the distance from the center of the aperture 218 up to the first rotating shaft 205 and the second rotating shaft 211 is 0.7 mm. This value, in the first embodiment, is 0.9 mm. In the second embodiment, in spite of this distance being comparatively shorter in the first embodiment, the angle of rotation of the diaphragm member from an opened state to the narrowed state is 30 degrees. Thus, the angle of rotation in the second embodiment is smaller than the angle of rotation 46 degrees in the first embodiment. As a result of this, with respect to an outer diameter (width) of the substrate in the first embodiment which is 2.2 mm, an outer diameter (width) of a diaphragm in the second embodiment is 1.7 mm.

THIRD EMBODIMENT

Figure 19:
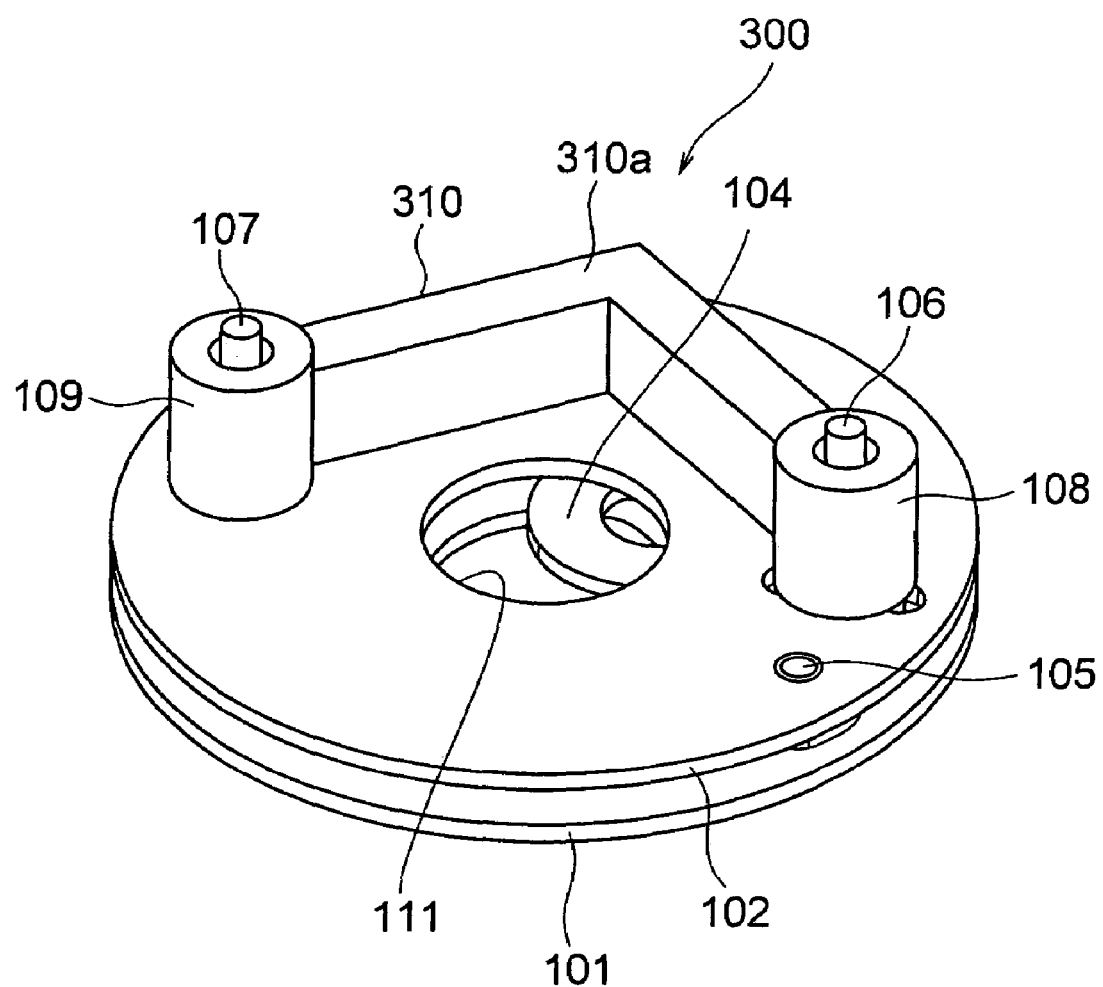
FIG. 19 is a diagram showing a perspective view of an optical diaphragm apparatus according to a third embodiment of the present invention.

FIG. 19 shows a perspective view of an optical diaphragm apparatus 300 according to a third embodiment of the present invention. Same reference numerals are used for components which are same as in the first embodiment, and a description to be repeated is omitted. In the third embodiment, an ion conducting high-polymer member 310 has a shape along the aperture 111, such as a shape of an ion containing polymer in a form of a plate (straight) which is bent near a central portion 310a.

The ringed shaped members 108 and 109 are provided at two ends of the ion conducting high-polymer member 310. Moreover, by a principle similar to the principle in the first embodiment and the second embodiment, it is possible to change a distance between the two points, in other words, a distance between the ring shaped members 108 and 109.

An actuator of the third embodiment has a very simple structure. Moreover, as compared to the conventional methods in which an inertial drive piezoelectric actuator and a rotating actuator of an electromagnetic rotary solenoid are used, it is possible to reduce the size substantially.

MODIFIED EMBODIMENT

Figure 20:
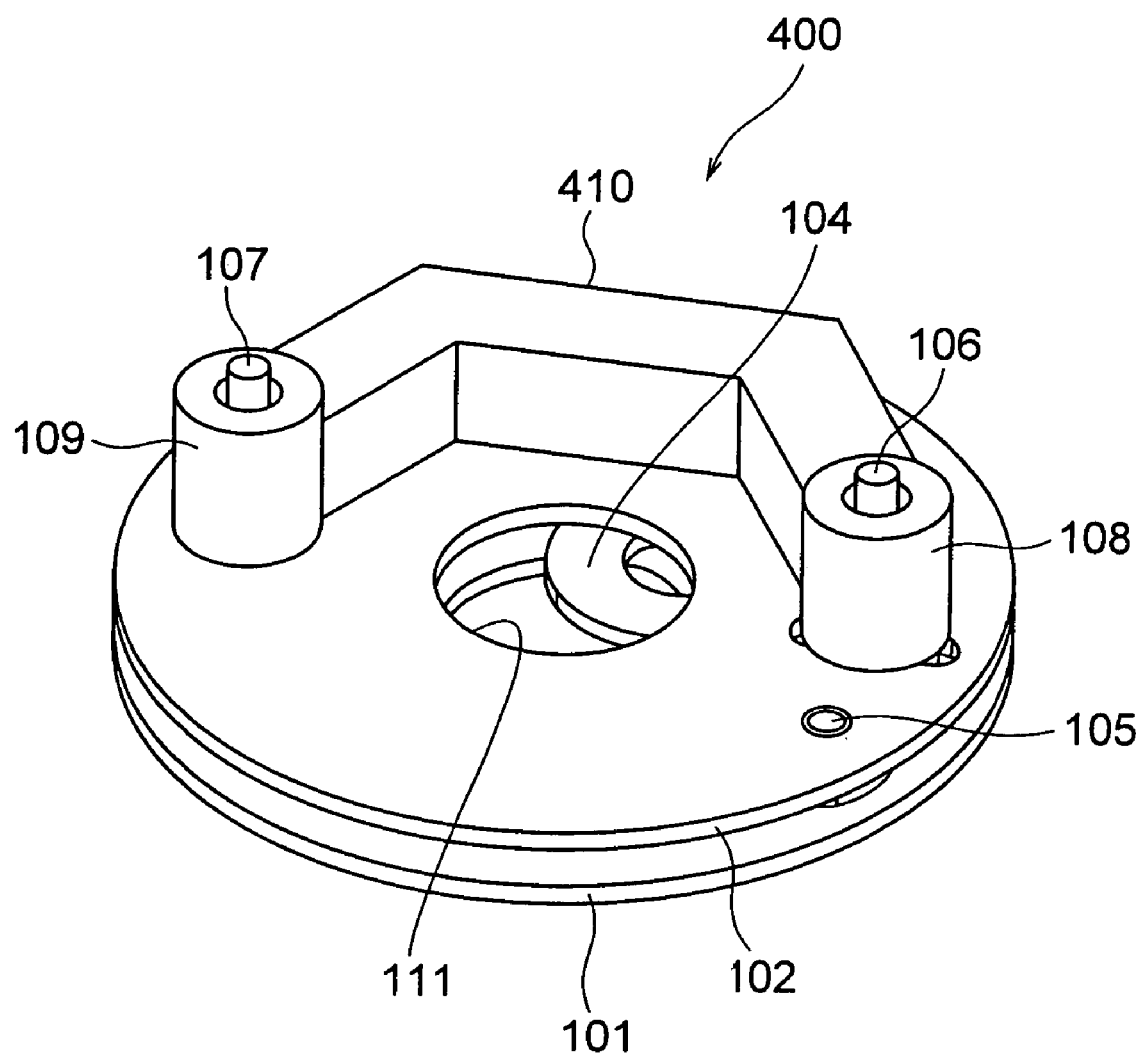
FIG. 20 is a diagram showing a perspective view of an optical diaphragm apparatus according to a modified embodiment of the third embodiment.
Figure 21:
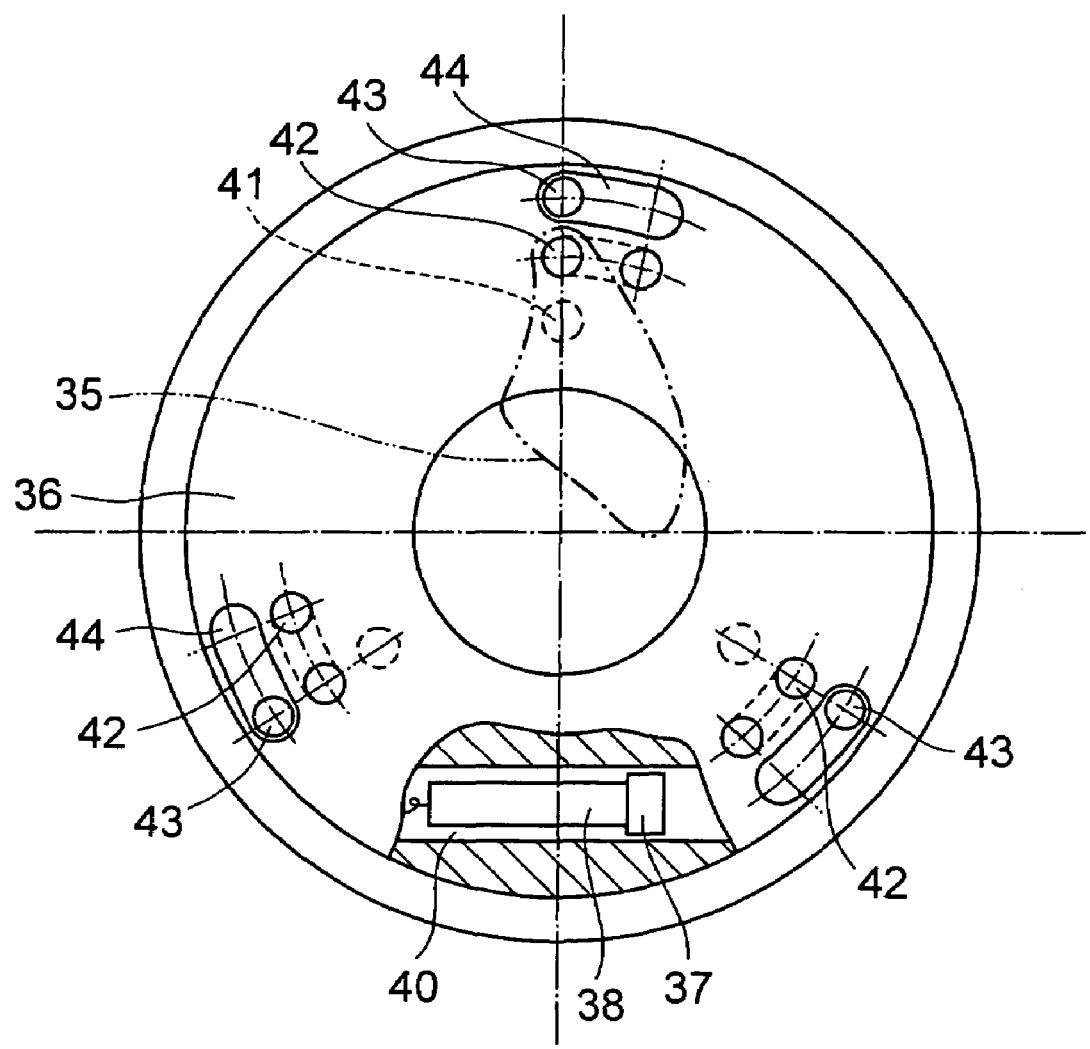
FIG. 21 is diagram showing a schematic view of a conventional optical diaphragm apparatus.
Figure 22:
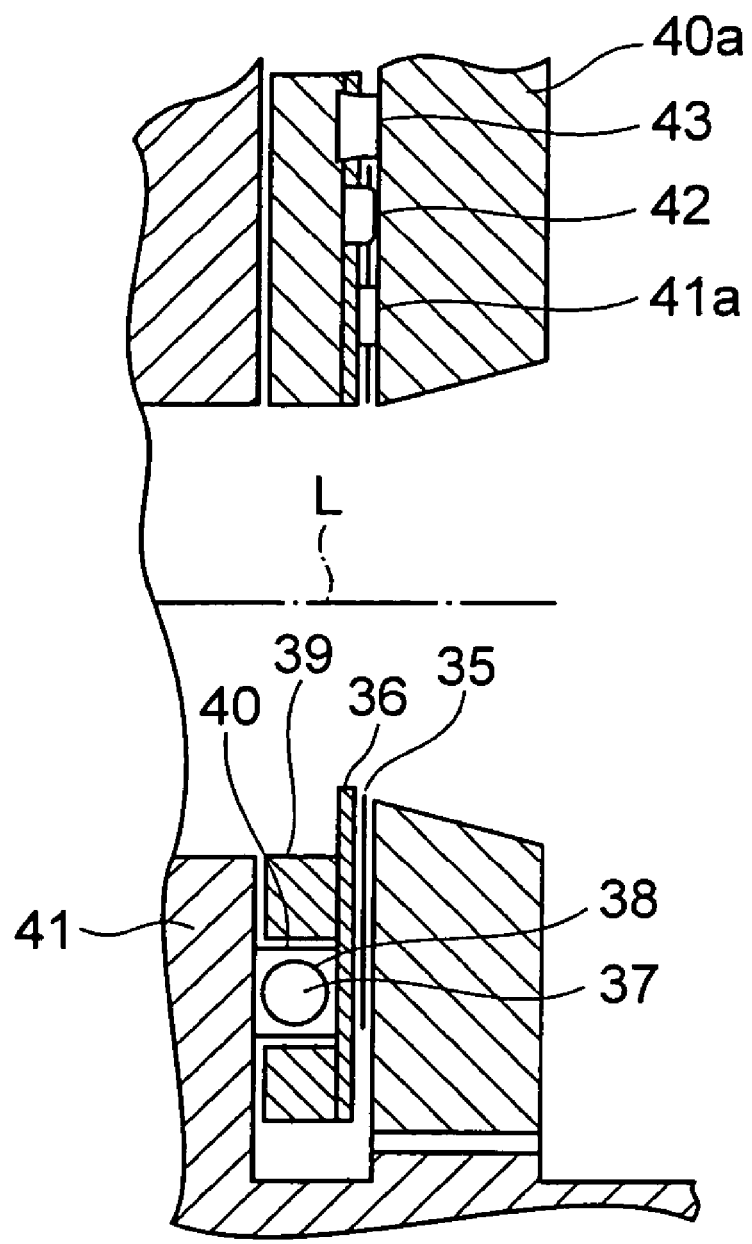
FIG. 22 is another diagram showing a schematic view of the conventional optical diaphragm apparatus.

FIG. 20 shows a perspective view of an optical diaphragm apparatus 400 according to a modified embodiment of the present invention. In the modified embodiment, an ion conducting high-polymer member 410 has a shape of a half cut orthohexagon, such as a shape of apart of a trapezoid. Even with such a shape, by the principle similar to the principle in the first embodiment and the second embodiment, it is possible to change the distance between the two points, in other words, the distance between the ring shaped members 108 and 109.

Therefore, by an actuator having a very simple structure, it is possible reduce substantially a size of the optical diaphragm apparatus 400.

The present invention can have various modified embodiment which fall within the basic teaching herein set forth.

Thus, the optical diaphragm apparatus according to the present invention is appropriate as a small size optical diaphragm apparatus, and particularly an optical diaphragm apparatus which is useful in a small diameter endoscope.

In the optical diaphragm apparatus according to the present invention, the chord length of the circular arc shaped actuator is changed. Due to the change in the chord length, the diaphragm member moves. Due to the movement of the diaphragm member, it is possible to change an aperture diameter of the optical aperture. Thus, since only changing the angular diameter of the actuator, in other words the curvature, serves the purpose, it is possible to make the structure very simple. As a result of this, it is possible to provide a small size optical diaphragm apparatus, particularly an optical diaphragm apparatus which is applicable in a small diameter endoscope.

What is claimed is:

1. An optical diaphragm apparatus comprising:
   a diaphragm ring which includes an optical aperture;
   a diaphragm member which includes a rotating shaft, a driving shaft, and a shielding section;
   an actuator having a flexible circular arc shape which is coupled with the driving shaft, and which rotates the diaphragm member around the rotating shaft as a center; and
   a controlling member which controls the actuator having the circular arc shape, wherein
   the controlling member changes a chord length of the actuator due to bending of the circular arc shaped actuator, and
   the shielding section is displaced due to a change in a relative rotational operation of the driving shaft with which the actuator is coupled, with respect to the rotating shaft, which is caused due to a change in the chord length of the actuator, and
   an aperture diameter of the optical aperture is changed by shielding a part of the optical aperture by the shielding section, due to rotation of the diaphragm member around the rotating axis as the center.

2. The optical diaphragm apparatus according to claim 1, wherein
   the actuator having the circular arc shape is formed of a high-polymer material which includes ions, and
   a pair of electrodes is formed on a first surface on a central side of a circular arc, and on a second surface which faces the first surface, and
   the chord length is changed by moving the ions in the high-polymer material by applying a voltage between the electrodes, by the controlling member.

3. The optical diaphragm apparatus according to claim 2, wherein
   one end of the actuator having the circular arc shape is coupled with the driving shaft, and
   the other end of the actuator is coupled with a member which is fixed to the diaphragm ring.

4. The optical diaphragm apparatus according to claim 3, wherein
   an end portion of the actuator having the circular arc shape is rotatably coupled with the member which is fixed to the diaphragm ring.

5. The optical diaphragm apparatus according to claim 3, wherein
   an end portion of the actuator having the circular arc shape is rotatably coupled with driving shaft of the diaphragm member.

6. The optical diaphragm apparatus according to claim 2, wherein
   the diaphragm member is formed by disposing a pair of diaphragm members which is made of two members, and
   two ends of the actuator having the circular arc shape are coupled with the driving shaft of the diaphragm members respectively.

7. The optical diaphragm apparatus according to claim 6, wherein
   an end portion of the actuator which has the circular arc shape is rotatably coupled with the driving shaft of the diaphragm member.

8. The optical diaphragm apparatus according to claim 2, wherein an end portion of the actuator having the circular arc shape is rotatably coupled with the driving shaft of the diaphragm member.

* * * * *

UNITED STATES PATENT AND TRADEMARK OFFICE
CERTIFICATE OF CORRECTION

PATENT NO.       : 7,635,229 B2                                              Page 1 of 1
APPLICATION NO. : 11/542925
DATED            : December 22, 2009
INVENTOR(S)      : Shinji Yasunaga It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 458 days.

Signed and Sealed this

Ninth Day of November, 2010

David J. Kappos
*Director of the United States Patent and Trademark Office*